(12) United States Patent
Kim

(10) Patent No.: US 12,382,096 B2
(45) Date of Patent: *Aug. 5, 2025

(54) METHOD AND DEVICE FOR CODING/DECODING IMAGE USING INTRA PREDICTION

(71) Applicant: B1 INSTITUTE OF IMAGE TECHNOLOGY, INC., Seoul (KR)

(72) Inventor: Ki Baek Kim, Daejeon (KR)

(73) Assignee: B1 INSTITUTE OF IMAGE TECHNOLOGY, INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/754,945

(22) Filed: Jun. 26, 2024

(65) Prior Publication Data
US 2024/0348822 A1 Oct. 17, 2024

Related U.S. Application Data

(63) Continuation of application No. 18/526,377, filed on Dec. 1, 2023, now Pat. No. 12,184,894, which is a (Continued)

(30) Foreign Application Priority Data

Sep. 7, 2018 (KR) .................. 10-2018-0107250
Sep. 17, 2018 (KR) .................. 10-2018-0110815
Sep. 19, 2018 (KR) .................. 10-2018-0112528

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/11* (2014.11);
(Continued)

(58) Field of Classification Search
None
See application file for complete search history.

(56) References Cited

U.S. PATENT DOCUMENTS 9,363,511 B2 6/2016 Zhang et al.
11,917,195 B2 * 2/2024 Kim .................. H04N 19/105
(Continued)

FOREIGN PATENT DOCUMENTS

EP 3905677 A1 11/2021
KR 10-2018-0001479 A 1/2018
(Continued)

OTHER PUBLICATIONS

Bross, Benjamin, et al. "Versatile Video Coding (Draft 6)" Document JVET-O2001-vE, Joint Video Experts Team (JVET) of ITU-T SG 16 WP 3 and ISO/IEC JTC 1/SC 29/WG 11, 15th Meeting: Gothenburg, SE, Jul. 3-12, 2019, (28 pages).

(Continued)

*Primary Examiner* — Delomia L Gilliard
(74) *Attorney, Agent, or Firm* — NSIP Law

(57) ABSTRACT

A method and a device for encoding/decoding an image according to the present invention may determine a reference region for intra prediction of a current block, derive an intra prediction mode of the current block on the basis of a predetermined MPM candidate group, and perform intra prediction on the current block on the basis of the reference region and the intra prediction mode.

7 Claims, 11 Drawing Sheets

Related U.S. Application Data continuation of application No. 17/273,848, filed as application No. PCT/KR2019/011556 on Sep. 6, 2019, now Pat. No. 11,917,195.

(51) Int. Cl.
  *H04N 19/11* (2014.01)
  *H04N 19/119* (2014.01)
  *H04N 19/176* (2014.01)
  *H04N 19/182* (2014.01)
  *H04N 19/46* (2014.01)

(52) U.S. Cl.
  CPC ......... *H04N 19/119* (2014.11); *H04N 19/176* (2014.11); *H04N 19/182* (2014.11); *H04N 19/46* (2014.11)

(56) References Cited

U.S. PATENT DOCUMENTS

| | | | |
|---|---|---|---|
| 2018/0098064 A1 | 4/2018 | Seregin et al. | |
| 2019/0116381 A1* | 4/2019 | Lee | H04N 13/161 |
| 2022/0368896 A1* | 11/2022 | Lee | H04N 19/593 |

FOREIGN PATENT DOCUMENTS

| | | | |
|---|---|---|---|
| KR | 10-2018-0011285 A | | 1/2018 |
| KR | 20180011285 A | * | 1/2018 |
| KR | 10-1867884 B1 | | 6/2018 |
| WO | WO 2017/176030 A1 | | 10/2017 |
| WO | WO 2017/222326 A1 | | 12/2017 |
| WO | WO 2018/016823 A1 | | 1/2018 |
| WO | WO 2018/067714 A1 | | 4/2018 |

OTHER PUBLICATIONS

Francois, Edouard, et al. "Non-CE6c: adaptations of Intra mode coding" JCTVC-H0175, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, (9 pages).

Yu, Yue, et al. "On MPM determination and Planar mode signaling" JCTVC-H0516-r3, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, (7 pages).

Ramasubramonian, Adarsh K., et al. "CE3-3.1.1: Two MPM modes and shape dependency (Test 3.1.1)" JVET-K0081, Joint Video Exploration Team (JVET) of ITU-T SB 16 WP 3 and ISO/IEC JTC 1/SC 29/WG 11, 11th Meeting: Ljubljana, SI, Jul. 10-18, 2018, (6 pages).

Jiang, Hui-Yu, et al. "CE3-related: Advanced MPM based on intra reference line selection scheme" JVET-K0175-v3, Joint Video Exploration Team (JVET) of ITU-T SB 16 WP 3 and ISO/IEC JTC 1/SC 29/WG 11, 11th Meeting: Ljubljana, SI, Jul. 10-18, 2018, (5 pages).

Zhao, Liang, et al. "CE3-related: MPM based multi-line intra prediction scheme." *Joint Video Exploration Team (JVET) of ITU-T SG 16 WP 3 and ISO/IEC JTC 1/SC 29/WG 11: 11th meeting: JVET-K0482: Jul. 2018.* (3 pages in English).

Benjamin Bross, et al. "Versatile Video Coding (Draft 2)" *Joint Video Experts Team JVET of ITU-T SG 16 WP3 and ISO/IEC JTC 1/SC 29/WG 11: 11th Meeting: Jul. 2018.* (86 pages in English).

International Search Report issued on Dec. 19, 2019 in counterpart International Patent Application No. PCT/KR2019/011556 (2 pages in English and 2 pages in Korean).

Brass, Benjamin. "CE3: Multiple reference line intra prediction (Test 1.1. 1, 1.1. 2, 1.1. 3 and 1.1. 4). Joint Video Experts Team (JVET) of ITU-T SG 16 WP 3 and ISO/IEC JTC 1/SC 29/WG 11." *12th Meeting: Macao, CN.* (Nov. 15, 2018). pp. 1-8.

Bross, et al. "Versatile Video Coding (Draft 2)." *Joint Video Experts Team (JVET) of ITU-T SG 16 WP 3 and ISO/IEC JTC 1/SC 29/WG 11th Meeting.* Jul. 10-18, 2018. pp. 1-16.

* cited by examiner

FIG. 3
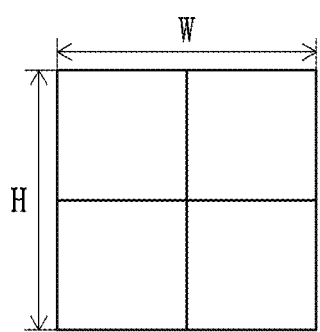
FIG.3A
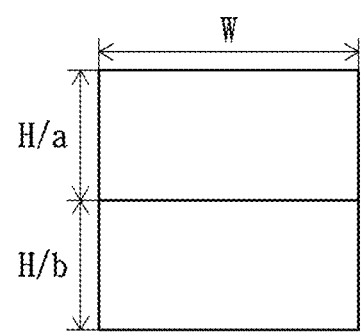
FIG.3B
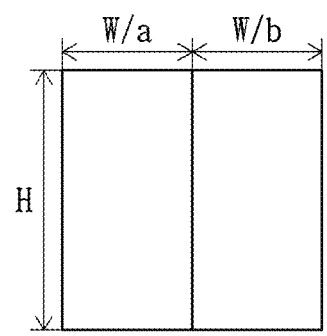
FIG.3C
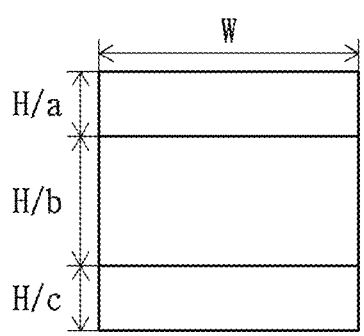
FIG.3D
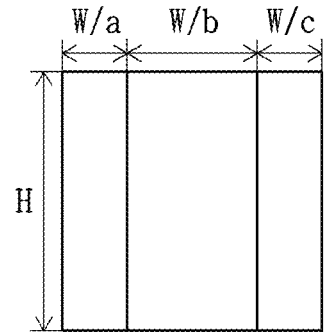
FIG.3E

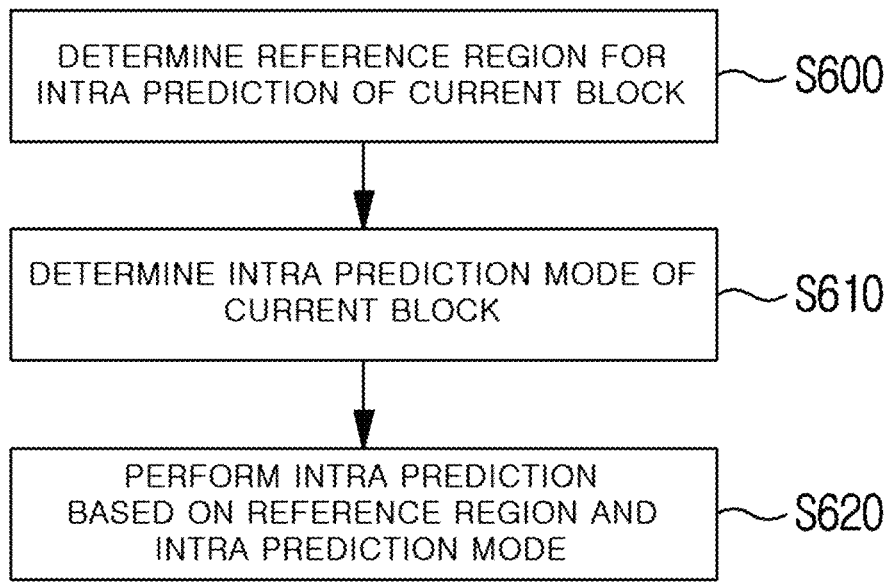
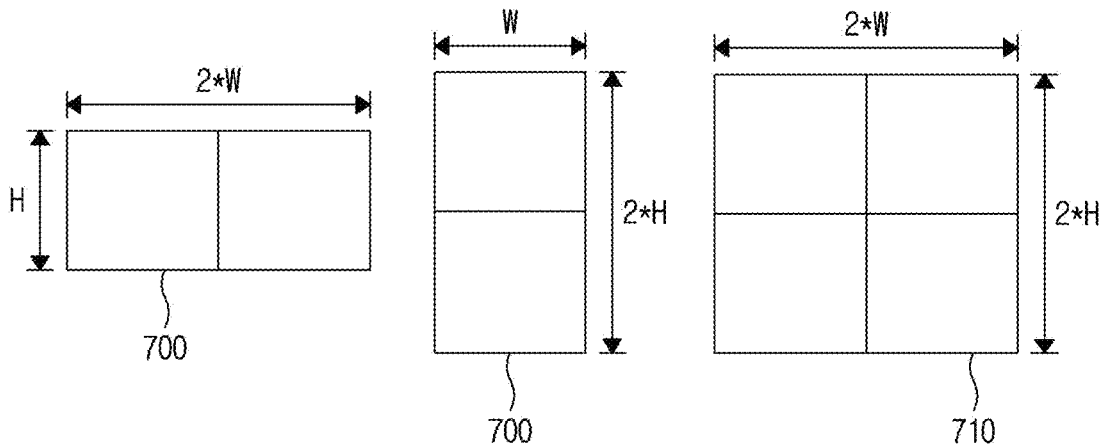

METHOD AND DEVICE FOR CODING/DECODING IMAGE USING INTRA PREDICTION

CROSS REFERENCE TO RELATED APPLICATIONS

This application is a continuation of application Ser. No. 18/526,377 filed on Dec. 1, 2023, which is a continuation of application Ser. No. 17/273,848 filed on Mar. 5, 2021, which is now U.S. Pat. No. 11,917,195, which is a U.S. National Stage Application of International Application No. PCT/KR2019/011556, filed on Sep. 6, 2019, which claims the benefit under 35 USC 119(a) and 365(b) of Korean Patent Application No. 10-2018-0107250, filed on Sep. 7, 2018, Korean Patent Application No. 10-2018-0110815, filed on Sep. 17, 2018, and Korean Patent Application No. 10-2018-0112528, filed on Sep. 19, 2018 in the Korean Intellectual Property Office, the entire disclosure of which is incorporated herein by reference for all purposes.

TECHNICAL FIELD

The present invention relates to an image encoding/decoding method and apparatus.

BACKGROUND ART

Recently, demand for high-resolution and high-quality images such as high definition (HD) images and ultra high definition (UHD) images is increasing in various application fields, and accordingly, high-efficiency image compression techniques are being discussed.

Various technologies exist, such as the inter prediction technology that predicts pixel values included in a current picture from a picture before or after a current picture using video compression technology, the intra prediction technology that predicts pixel values included in a current picture by using pixel information in a current picture, an entropy encoding technology that allocates a short code to a value with a high frequency of appearance and a long code to a value with a low frequency of appearance. Image data can be effectively compressed by using such image compression technology, and transmitted or stored.

DISCLOSURE

Technical Problem

An object of the present invention is to provide a method and apparatus for deriving an intra prediction mode.

An object of the present invention is to provide an intra prediction method and apparatus according to component types.

An object of the present invention is to provide a block division method and apparatus for intra prediction.

Technical Solution

An image encoding/decoding method and apparatus of the present invention may determine a reference region for intra prediction of a current block, derive an intra prediction mode of the current block based on a predetermined MPM candidate group, and perform the intra prediction on the current block based on the reference region and the intra prediction mode.

In an image encoding/decoding method and apparatus of the present invention, the MPM candidate group may be divided into a first group and a second group, the first group may include a default mode pre-defined in a decoding apparatus, and the second group may include an intra prediction mode of a neighboring block adjacent to the current block.

In an image encoding/decoding method and apparatus of the present invention, the intra prediction mode of the current block may be derived by selectively using one of the first group or the second group.

In an image encoding/decoding method and apparatus of the present invention, determining the reference region may comprise selecting one of a plurality of pixel lines pre-defined in the decoding apparatus, and determining the selected pixel line as the reference region.

In an image encoding/decoding method and apparatus of the present invention, the plurality of pre-defined pixel lines may include at least one of a first pixel line adjacent to the current block, a second pixel line adjacent to the first pixel line, a third pixel line adjacent to the second pixel line or a fourth pixel line adjacent to the third pixel line.

In an image encoding/decoding method and apparatus of the present invention, the default mode may be composed of only a non-directional mode, and the non-directional mode may include at least one of a planar mode or a DC mode.

In an image encoding/decoding method and apparatus of the present invention, the second group further may include a mode derived by adding or subtracting an N value to the intra prediction mode of the neighboring block, and the N value may be 1, 2, or 3.

An image encoding/decoding method and apparatus of the present invention may obtain a first flag from the bitstream, and the first flag may indicate whether the intra prediction mode of the current block is derived from the first group.

In an image encoding/decoding method and apparatus of the present invention, when a value of the first flag is a first value, the intra prediction mode of the current block may be set to an MPM belonging to the first group, and when the value of the first flag is a second value, the intra prediction mode of the current block may be derived based on the second group and an MPM index.

In an image encoding/decoding method and apparatus of the present invention, the first flag may be signaled only when the reference region of the current block is determined to be the first pixel line.

The image encoding/decoding method and apparatus of the present invention may determine an intra prediction mode of a current block and perform intra prediction on a current block based on the determined intra prediction mode.

In the image encoding/decoding method and apparatus of the present invention, the intra prediction mode of the current block may be derived for a luma block and a chroma block, respectively.

In the image encoding/decoding method and apparatus of the present invention, an intra prediction mode of a luma block is derived based on an MPM list and an MPM index, and the MPM list may include at least one of an intra prediction mode of a neighboring block (ModeA), ModeA+n, ModeA−n, or a default mode.

An image encoding/decoding method and apparatus of the present invention may specify a luma region for inter-component reference of a chroma block, perform down-sampling for the luma region, derive a parameter for inter-component reference of the chroma block, and predict the chroma block based on the down-sampled luma block and the parameter.

In the image encoding/decoding method and apparatus of the present invention, the current block is divided into a plurality of sub-blocks, and the division may be performed based on at least one of a size or a shape of the current block.

Advantageous Effects

According to the present invention, prediction may be more accurately and efficiently performed by deriving an intra prediction mode based on an MPM candidate group.

According to the present invention, it is possible to improve the efficiency of inter prediction based on inter-component reference.

The present invention may improve the efficiency of intra prediction encoding/decoding through adaptive block division.

DESCRIPTION OF DRAWINGS

FIG. 3 illustrates a block division type according to an embodiment to which the present invention is applied.

FIG. 6 illustrates an intra prediction method according to an embodiment to which the present invention is applied.

FIG. 7 illustrates an intra prediction method in units of sub-blocks as an embodiment to which the present invention is applied.

BEST MODE FOR INVENTION

Figure 1:
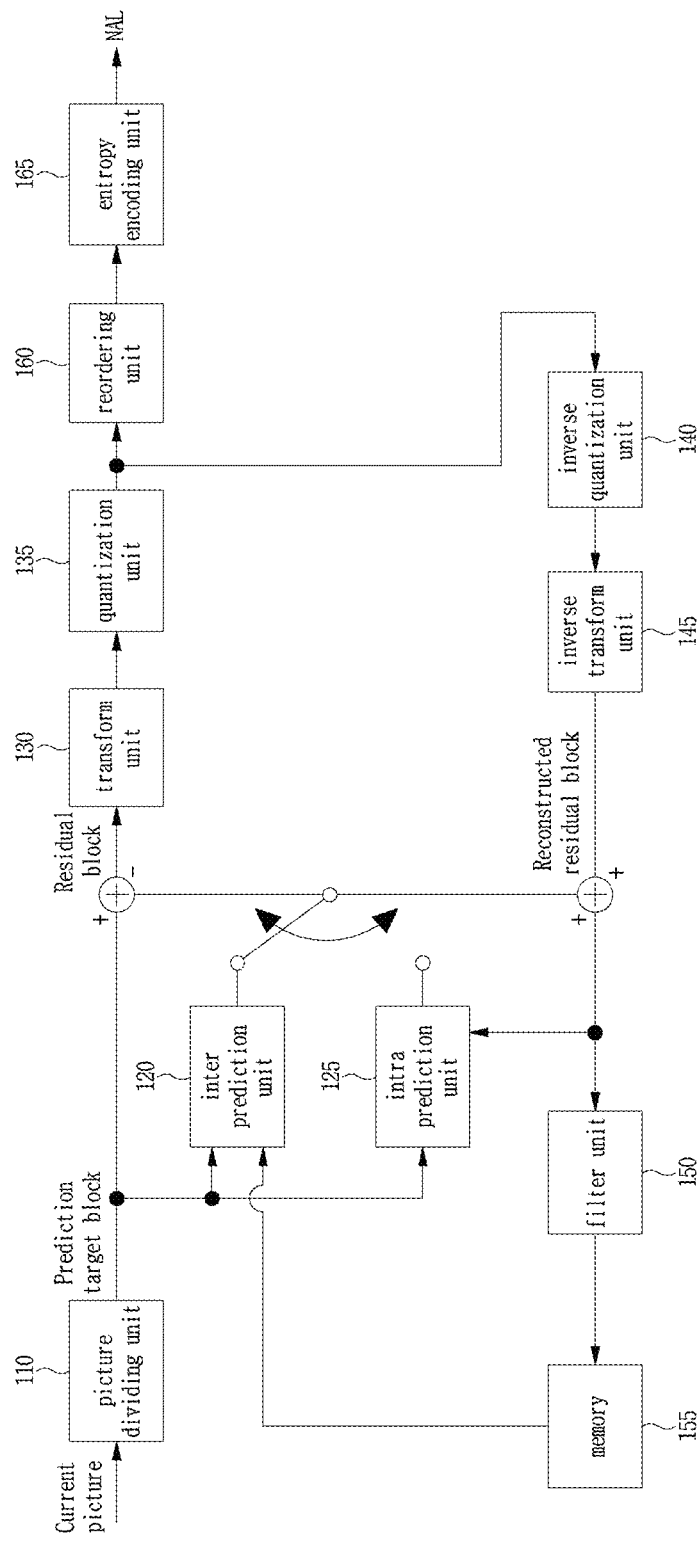
FIG. 1 is a block diagram illustrating an image encoding apparatus according to an embodiment of the present invention.

An image encoding/decoding method and apparatus of the present invention may determine a reference region for intra prediction of a current block, derive an intra prediction mode of the current block based on a predetermined MPM candidate group, and perform the intra prediction on the current block based on the reference region and the intra prediction mode.

In an image encoding/decoding method and apparatus of the present invention, the MPM candidate group may be divided into a first group and a second group, the first group may include a default mode pre-defined in a decoding apparatus, and the second group may include an intra prediction mode of a neighboring block adjacent to the current block.

In an image encoding/decoding method and apparatus of the present invention, the intra prediction mode of the current block may be derived by selectively using one of the first group or the second group.

In an image encoding/decoding method and apparatus of the present invention, determining the reference region may comprise selecting one of a plurality of pixel lines pre-defined in the decoding apparatus, and determining the selected pixel line as the reference region.

In an image encoding/decoding method and apparatus of the present invention, the plurality of pre-defined pixel lines may include at least one of a first pixel line adjacent to the current block, a second pixel line adjacent to the first pixel line, a third pixel line adjacent to the second pixel line or a fourth pixel line adjacent to the third pixel line.

In an image encoding/decoding method and apparatus of the present invention, the default mode may be composed of only a non-directional mode, and the non-directional mode may include at least one of a planar mode or a DC mode.

In an image encoding/decoding method and apparatus of the present invention, the second group further may include a mode derived by adding or subtracting an N value to the intra prediction mode of the neighboring block, and the N value may be 1, 2, or 3.

An image encoding/decoding method and apparatus of the present invention may obtain a first flag from the bitstream, and the first flag may indicate whether the intra prediction mode of the current block is derived from the first group.

In an image encoding/decoding method and apparatus of the present invention, when a value of the first flag is a first value, the intra prediction mode of the current block may be set to an MPM belonging to the first group, and when the value of the first flag is a second value, the intra prediction mode of the current block may be derived based on the second group and an MPM index.

In an image encoding/decoding method and apparatus of the present invention, the first flag may be signaled only when the reference region of the current block is determined to be the first pixel line.

The image encoding/decoding method and apparatus of the present invention may determine an intra prediction mode of a current block and perform intra prediction on a current block based on the determined intra prediction mode.

In the image encoding/decoding method and apparatus of the present invention, the intra prediction mode of the current block may be derived for a luma block and a chroma block, respectively.

In the image encoding/decoding method and apparatus of the present invention, an intra prediction mode of a luma block is derived based on an MPM list and an MPM index, and the MPM list may include at least one of an intra prediction mode of a neighboring block (ModeA), ModeA+n, ModeA−n, or a default mode.

An image encoding/decoding method and apparatus of the present invention may specify a luma region for inter-component reference of a chroma block, perform down-sampling for the luma region, derive a parameter for inter-component reference of the chroma block, and predict the chroma block based on the down-sampled luma block and the parameter.

In the image encoding/decoding method and apparatus of the present invention, the current block is divided into a plurality of sub-blocks, and the division may be performed based on at least one of a size or a shape of the current block.

MODE FOR INVENTION

The present invention may be changed and modified variously and be illustrated with reference to different exemplary embodiments, some of which will be described and shown in the drawings. However, these embodiments are not intended for limiting the invention but are construed as including includes all modifications, equivalents and replacements which belong to the spirit and technical scope of the invention. Like reference numerals in the drawings refer to like elements throughout.

Although the terms first, second, etc. may be used to describe various elements, these elements should not be limited by these terms. These terms are used only to distinguish one element from another element. For example, a first element could be termed a second element and a second element could be termed a first element likewise without departing from the teachings of the present invention. The term "and/or" includes any and all combinations of a plurality of associated listed items.

It will be understood that when an element is referred to as being "connected to" or "coupled to" another element, the element can be directly connected or coupled to another element or intervening elements. On the contrary, when an element is referred to as being "directly connected to" or "directly coupled to" another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram illustrating an image encoding apparatus according to an embodiment of the present invention.

Referring to FIG. 1, the image encoding apparatus 100 includes a picture dividing unit 110, prediction units 120 and 125, a transform unit 130, a quantization unit 135, a reordering unit 160, an entropy encoding unit 165, an inverse quantization unit 140, an inverse transform unit 145, a filter unit 150, and a memory 155.

Each of the elements shown in FIG. 1 is shown independently to represent different characteristic functions in the encoding apparatus, and does not mean that each element is made up of separate hardware or one software element. That is, the elements are independently arranged for convenience of description, wherein at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Some elements are not essential to the substantial functions in the invention and may be optional constituents for merely improving performance. The invention may be embodied by including only constituents essential to embodiment of the invention, except for constituents used to merely improve performance. The structure including only the essential constituents except for the optical constituents used to merely improve performance belongs to the scope of the invention.

The picture dividing unit 110 may divide the input picture into at least one processing unit. In this case, the processing unit may be a prediction unit (PU), a transform unit (TU), or a coding unit (CU). The picture dividing unit 110 may divide one picture into a plurality of combinations of a coding unit, a prediction unit, and a transformation unit, and select one combination of a coding unit, a prediction unit, and a transformation unit based on a predetermined criterion (for example, a cost function) to encode the picture.

For example, one picture may be divided into a plurality of coding units. In order to divide a picture into the coding units, a recursive tree structure such as a quad tree structure may be used. One image or a maximum coding block (largest coding unit) as a root may be divided into other coding units, and may be divided with as many child nodes as the number of divided coding units. A coding unit that are no longer divided according to certain restrictions become a leaf node. That is, when it is assumed that only square division is possible for one coding unit, one coding unit may be divided into up to four different coding units.

In the embodiments of the invention, a coding unit may be used to refer to not only a unit of encoding but also a unit of decoding.

The prediction unit may be a block divided in a shape such as at least one square or rectangle of the same size within one coding unit, or one prediction unit among the prediction units divided within one coding unit may have a different shape and/or size from another prediction unit.

When a prediction unit that performs intra prediction based on a coding unit is not a minimum coding unit, intra prediction may be performed without dividing into a plurality of prediction units N×N.

The prediction units 120 and 125 may include an inter prediction unit 120 to perform inter prediction and an intra prediction unit 125 to perform intra prediction. The prediction units 120 and 125 may determine which of inter prediction and intra prediction is performed on a PU, and may determine specific information (for example, an intra prediction mode, a motion vector, and a reference picture) of the determined prediction method. Here, a processing unit on which prediction is performed may be different from a processing unit for which a prediction method and specific information thereon are determined. For example, a prediction method and a prediction mode may be determined for each PU, while prediction may be performed for each TU. A residual value (residual block) between a generated predicted block and an original block may be input to the transform unit 130. Further, prediction mode information, motion vector information and the like used for prediction may be encoded along with the residual value by the entropy encoding unit 165 and be transmitted to the decoding apparatus. When a specific encoding mode is used, the original block may be encoded and transmitted to the decoding apparatus without generating a prediction block by the prediction units 120 and 125.

The inter prediction unit 120 may predict a PU based on information on at least one picture among a previous picture of a current picture and a subsequent picture of a current picture. In some cases, the inter prediction unit 120 may predict a PU based on information of a partially encoded region in the current picture. The inter prediction unit 120 may include a reference picture interpolation unit, a motion prediction unit, and a motion compensation unit.

The reference picture interpolation unit may be supplied with reference picture information from the memory 155 and generate pixel information less than or equal to an integer pixel on a reference picture. In the case of luma pixels, a DCT-based 8-tap interpolation filter with a variable filter coefficient may be used to generate pixel information less than or equal to an integer pixel in a unit of a ¼ pixel. In the case of chrominance pixels, a DCT-based 4-tap interpolation filter with a variable filter coefficient may be used to generate pixel information less than or equal to an integer pixel in a unit of a ⅛ pixel.

The motion prediction unit may perform motion prediction on the basis of the reference picture interpolated by the reference picture interpolation unit. Various methods, such as a full search-based block matching algorithm (FBMA), a three-step search (TSS) algorithm and a new three-step search (NTS) algorithm, may be used to calculate a motion vector. A motion vector has a motion vector value in the unit of a ½ or ¼ pixel on the basis of an interpolated pixel. The motion prediction unit may predict a current PU using different motion prediction methods. Various methods, such as skip mode, merge mode, advanced motion vector prediction (AMVP) mode, and intra block copy mode, etc. may be used as the motion prediction method.

The intra prediction unit 125 may generate a PU on the basis of information on a reference pixel neighboring to a current block. When a reference pixel is a pixel for which inter prediction has been performed because a block neighboring to the current PU is a block for which inter prediction has been performed, information on a reference pixel in the block for which inter prediction has been performed may be replaced with information on a reference pixel in a block for which intra prediction has been performed. That is, when a reference pixel is not available, information on the unavailable reference pixel may be replaced with information on at least one reference pixel of the available reference pixels.

A prediction mode of intra prediction includes a directional prediction mode in which reference pixel information is used according to a prediction direction and a non-directional prediction mode in which information on direction is not used in performing prediction. A mode for predicting luma information and a mode for predicting chroma information may be different from each other. Further, intra prediction mode information used to predict luma information or the predicted luma signal information may be used to predict chroma information.

When the size of the prediction unit and the size of the transform unit are the same in performing intra prediction, intra prediction for the prediction unit may be performed based on a pixel on the left, a pixel on the top-left, and a pixel on the top of the prediction unit. However, when the size of the prediction unit and the size of the transform unit are different in performing intra prediction, intra prediction may be performed using a reference pixel determined based on the transform unit. Also, intra prediction using N×N division may be used for only the minimum coding unit.

In the intra prediction method, a predicted block may be generated by applying an adaptive intra smoothing (AIS) filter to the reference pixels according to the prediction mode. Different types of AIS filters may be applied to the reference pixels. In the intra prediction method, the intra prediction mode of a current PU may be predicted from an intra prediction mode of a PU neighboring to the current PU. In predicting the prediction mode of the current PU using mode information predicted from a neighboring PU, when the current PU and the neighboring PU have the same intra prediction mode, information indicating that the current PU and the neighboring PU have the same prediction mode may be transmitted using predetermined flag information. When the current PU and the neighboring PU have different prediction modes, information on the prediction mode of the current block may be encoded by entropy encoding.

A residual block including residual information may be generated. The residual information is a difference between a predicted unit generated by the prediction units 120 and 125 and an original block of the prediction unit. The generated residual block may be input to the transform unit 130.

The transform unit 130 may transform the residual block including the residual information between the predicted unit generated by the prediction units 120 and 125 and the original block by using a transform type such as DCT (Discrete Cosine Transform), DST (Discrete Sine Transform), or KLT. Whether to apply DCT, DST, or KLT to transform the residual block may be determined based on intra prediction mode information of the prediction unit used to generate the residual block.

The quantization unit 135 may quantize values transformed into a frequency domain by the transform unit 130. A quantization coefficient may be changed depending on a block or importance of an image. Values output from the quantization unit 135 may be provided to the inverse quantization unit 140 and the rearrangement unit 160.

The rearrangement unit 160 may perform the rearrangement of the coefficient values for the quantized residual.

The rearrangement unit 160 may change coefficients of a two-dimensional (2D) block into coefficients of a one-dimensional (1D) vector through coefficient scanning method. For example, the rearrangement unit 160 may scan a DC coefficient to a coefficient in the high-frequency region using Zig-Zag scan method, and change it into a one-dimensional vector form. Depending on the size of the transform unit and the intra prediction mode, instead of zig-zag scan, a vertical scan that scans a two-dimensional block shape coefficient in a column direction and a horizontal scan that scans a two-dimensional block shape coefficient in a row direction may be used. That is, according to the size of the transform unit and the intra prediction mode, it is possible to determine which of a zig-zag scan, a vertical direction scan, and a horizontal direction scan is to be used.

The entropy encoding unit 165 may perform entropy encoding on the basis of the values obtained by the rearrangement unit 160. Various encoding methods, such as exponential Golomb coding, context-adaptive variable length coding (CAVLC), or context-adaptive binary arithmetic coding (CABAC), may be used for entropy encoding.

The entropy encoding unit 165 may encode a variety of information, such as residual coefficient information and block type information of a coding unit, prediction mode information, division unit information, prediction unit information, transfer unit information, motion vector information, reference frame information, block interpolation information and filtering information from the rearrangement unit 160 and the prediction units 120 and 125.

The entropy encoding unit 165 may entropy-encode coefficients of a CU input from the rearrangement unit 160.

The inverse quantization unit 140 and the inverse transform unit 145 dequantize the values which are quantized by the quantization unit 135 and inverse-transform the values which are transformed by the transform unit 130. A reconstructed block may be generated by adding the residual values to the predicted PU. The residual values may be generated by the inverse quantization unit 140 and the inverse transform unit 145. The predicted PU may be predicted by the motion vector prediction unit, the motion compensation unit, and the intra prediction unit of the prediction units 120 and 125.

The filter unit 150 may include at least one of a deblocking filter, an offset unit, and an adaptive loop filter (ALF).

The deblocking filter may remove block distortion generated by boundaries between blocks in a reconstructed picture. Whether to apply the deblocking filter to a current block may be determined on the basis of pixels included in several rows or columns of the block. When the deblocking filter is applied to a block, a strong filter or a weak filter may be applied depending on a required deblocking filtering strength. When horizontal filtering and vertical filtering are performed in applying the deblocking filter, the horizontal filtering and vertical filtering may be performed in parallel.

The offset unit may apply the offset with respect to the original image to the deblocking filtered image, in units of pixels. A region to which the offset may be applied may be determined after partitioning pixels of a picture into a predetermined number of regions. The offset may be applied to the determined region in consideration of edge information on each pixel or the method of applying the offset to the determined region.

The ALF may perform filtering based on a comparison result of the filtered reconstructed image and the original image. Pixels included in an image may be partitioned into predetermined groups, a filter to be applied to each group may be determined, and differential filtering may be performed for each group. Information on whether to apply the ALF may be transferred by each coding unit (CU) and a shape and filter coefficients of an ALF to be applied to each block may vary. Further, an ALF with the same form (fixed form) may be applied to a block regardless of characteristics of the block.

The memory 155 may store a reconstructed block or picture output from the filter unit 150, and the stored reconstructed block or picture may be supplied to the prediction units 120 and 125 when performing inter prediction.

Figure 2:
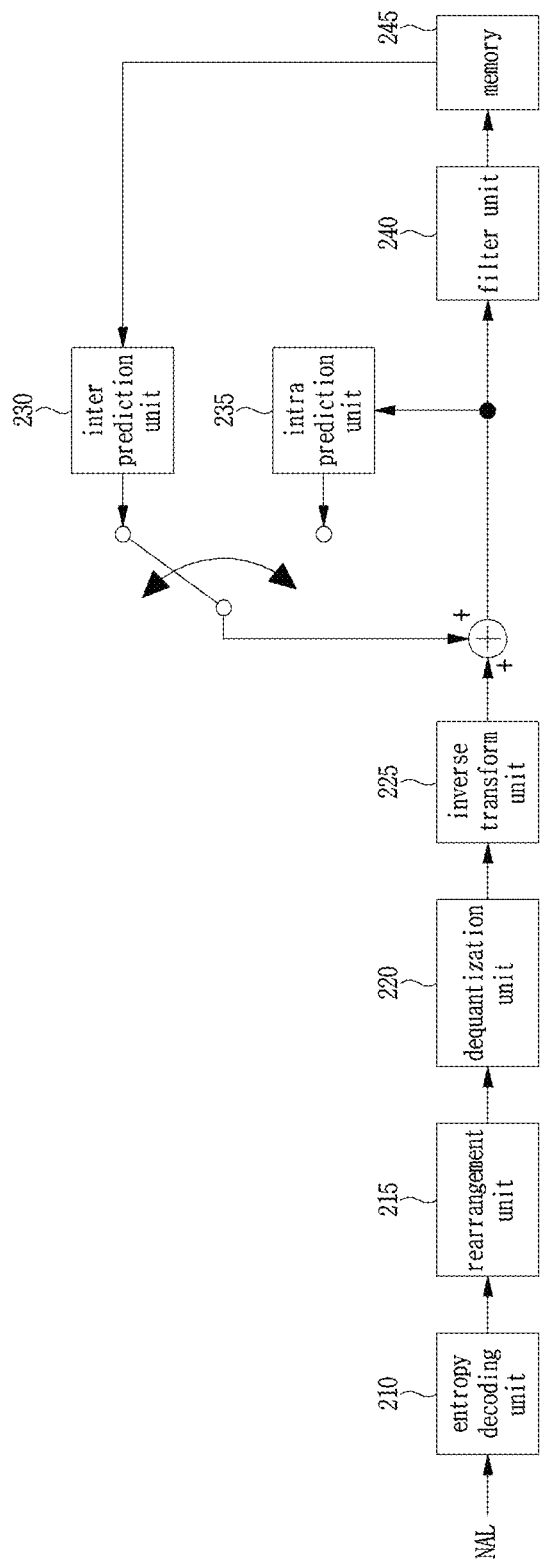
FIG. 2 is a block diagram illustrating an image decoding apparatus according an exemplary embodiment of the present invention.

FIG. 2 is a block diagram illustrating an image decoding apparatus according an exemplary embodiment of the present invention.

Referring to FIG. 2, the image decoding apparatus 200 may include an entropy decoding unit 210, a rearrangement unit 215, a dequantization unit 220, an inverse transform unit 225, prediction units 230 and 235, a filter unit 240, and a memory 245.

When an image bitstream is input from the image encoding apparatus, the input bitstream may be decoded in a procedure opposite to that of the image encoding apparatus.

The entropy decoding unit 210 may perform entropy decoding in a procedure opposite to that of performing entropy encoding in an entropy encoding unit of an image encoding apparatus. For example, various methods, such as exponential Golomb coding, CAVLC or CABAC, may be applied corresponding to the method performed by the image encoding apparatus.

The entropy decoding unit 210 may decode information associated with intra prediction and inter prediction performed by the encoding apparatus.

The rearrangement unit 215 may perform rearrangement on the bitstream entropy-decoded by the entropy decoding unit 210 based on the rearrangement method of the encoding apparatus. The rearrangement unit 215 may reconstruct and rearrange coefficients of a 1D vector into coefficients of a 2D block. The rearrangement unit 215 may be provided with information on coefficient scanning performed by the encoding apparatus and may perform rearrangement using a method of inversely scanning the coefficients, on the basis of scanning order performed by the encoding apparatus.

The dequantization unit 220 may perform dequantization on the basis of a quantization parameter provided by the encoding apparatus and the rearranged coefficients of the block.

The inverse transform unit 225 may perform an inverse transform, that is, an inverse DCT, an inverse DST, and an inverse KLT, with respect to the transform performed by the transform unit, that is, DCT, DST, and KLT on the quantization result performed by the image encoding apparatus. The inverse transform may be performed based on a transmission unit determined by the image encoding apparatus. The inverse transform unit 225 of the image decoding apparatus may selectively perform a transform technique (e.g., DCT, DST, KLT) according to a plurality of pieces of information such as a prediction method, a size of a current block, and a prediction direction.

The prediction units 230 and 235 may generate a prediction block on the basis of information for generating prediction block and information on a previously-decoded block or picture provided. The information for generating prediction block may be provided from the entropy decoding unit 210. The information on a previously-decoded block or picture may be provided from the memory 245.

As described above, when the size of the prediction unit and the size of the transform unit are the same when intra prediction is performed in the same manner as the operation of the image encoding apparatus, intra prediction for the prediction unit may be performed based on a pixel on the left, a pixel on the top-left, and a pixel on the top of the prediction unit. However, when the size of the prediction unit and the size of the transform unit are different from each other when performing intra prediction, the intra prediction for the prediction unit may be performed using a reference pixel determined based on the transform unit. In addition, intra prediction using N×N division may be used for only the minimum coding unit.

The prediction units 230 and 235 may include a prediction unit determination unit, an inter prediction unit and an intra prediction unit. The prediction unit determination unit may receive a variety of information, such as prediction unit information, prediction mode information of an intra prediction method and motion prediction-related information of an inter prediction method, etc. from the entropy decoding unit 210, may determine a prediction unit for a current coding unit. The prediction unit determination unit may determine which of the inter prediction and the intra prediction is performed on the prediction unit. An inter prediction unit 230 may perform inter prediction on a current prediction unit on the basis of information on at least one picture among a previous picture and a subsequent picture of a current picture including the current prediction unit. Herein, an inter prediction unit 230 may use information necessary for inter prediction for the current prediction unit provided from the image encoding apparatus. The inter prediction may be performed on the basis of the information of the pre-reconstructed partial region in the current picture including the current prediction unit.

In order to perform inter prediction, it may be determined, in an unit of a coding unit, whether a motion prediction method for a prediction unit included in the coding unit is a skip mode, a merge mode, an AMVP mode or an intra block copy mode.

An intra prediction unit 235 may generate a prediction block on the basis of pixel information in a current picture.

When a prediction unit is a prediction unit for which intra prediction is performed, intra prediction may be performed based on intra prediction mode information on the prediction unit provided from the image encoding apparatus. The intra prediction unit 235 may include an AIS (Adaptive Intra Smoothing) filter, a reference pixel interpolation unit, and a DC filter. The AIS filter performs filtering on reference pixels of a current block. The AIS filter may decide whether to apply the filter or not, depending on a prediction mode for the current prediction unit. AIS filtering may be performed on the reference pixels of the current block using the prediction mode for the prediction unit and information on the AIS filter provided from the image encoding apparatus. When the prediction mode for the current block is a mode not performing AIS filtering, the AIS filter may not be applied.

When the prediction mode for the prediction unit indicates a prediction mode of performing intra prediction on the basis of pixel values obtained by interpolating the reference pixels, the reference pixel interpolation unit may generate reference pixels in a unit of a fractional pixel less than an integer pixel (i.e. full pixel) by interpolating the reference pixels. When the prediction mode for the current prediction unit indicates a prediction mode of generating a prediction block without interpolating the reference pixels, the reference pixels may not be interpolated. The DC filter may generate a prediction block through filtering when the prediction mode for the current block is the DC mode.

The reconstructed block or picture may be provided to the filter unit 240. The filter unit 240 includes a deblocking filter, an offset unit, and an ALF.

The image encoding apparatus may provide information on whether the deblocking filter is applied to a corresponding block or picture, and information on which of a strong filter and a weak filter is applied when the deblocking filter is used. The deblocking filter of the image decoding apparatus may be provided with information on the deblocking filter from the image encoding apparatus and may perform deblocking filtering on a corresponding block.

The offset unit may apply offset to the reconstructed picture on the basis of information on an offset type and offset value applied to the picture in the encoding process.

The ALF may be applied to a coding unit on the basis of information on whether the ALF is applied and ALF coefficient information, etc. provided from the encoding apparatus. The ALF information may be included and provided in a specific parameter set.

The memory 245 may store the reconstructed picture or block for use as a reference picture or a reference block and may provide the reconstructed picture to an output unit.

As described above, in an embodiment of the present invention, for convenience of description, a coding unit is used as an encoding unit, but it may be an unit that performs not only encoding but also decoding.

FIG. 3 illustrates a block division type according to an embodiment to which the present invention is applied.

One block (hereinafter, referred to as a first block) may be divided into a plurality of sub-blocks (hereinafter, referred to as a second block) by at least one of a vertical line or a horizontal line. The number of each of the vertical and horizontal lines may be one, two, or more. Here, the first block may be a coding block (CU) which is a basic unit of image encoding/decoding, a prediction block (PU) which is a basic unit of prediction encoding/decoding or a transform block (TU) which is a basic unit of transform encoding/decoding. The first block may be a square block or a non-square block.

The division of the first block may be performed based on a quad tree, a binary tree, a triple tree, etc., and will be described in detail with reference to FIG. 3.

FIG. 3A illustrates a quad tree division (QT). QT is a division type in which the first block is divided into four second blocks. For example, when the first block of 2N×2N is divided by QT, the first block may be divided into four second blocks having N×N size. QT may be limited to apply to a square block only, but it is also applicable to a non-square block.

FIG. 3B illustrates a horizontal binary tree (hereinafter, referred to as Horizontal BT) division. Horizontal BT is a division type in which the first block is divided into two second blocks by one horizontal line. This division may be performed symmetrically or asymmetrically. For example, when the first block of 2N×2N is divided based on Horizontal BT, the first block may be divided into two second blocks with a height ratio of (a:b). Here, a and b may be the same value, and a may be larger or smaller than b.

FIG. 3C illustrates a vertical binary tree (hereinafter, referred to as Vertical BT) division. Vertical BT is a division type in which the first block is divided into two second blocks by one vertical line. This division may be performed symmetrically or asymmetrically. For example, when the first block of 2N×2N is divided based on Vertical BT, the first block may be divided into two second blocks with a width ratio of (a:b). Here, a and b may be the same value, and a may be larger or smaller than b.

FIG. 3D illustrates a horizontal triple tree (hereinafter, referred to as Horizontal TT) division. Horizontal TT is a division type in which the first block is divided into three second blocks by two horizontal lines. For example, when the first block of 2N×2N is divided based on Horizontal TT, the first block may be divided into three second blocks with a height ratio of (a:b:c). Here, a, b, and c may be the same value. Alternatively, a and c may be the same, and b may be greater or less than a.

FIG. 3E illustrates a vertical triple tree (hereinafter, referred to as Vertical TT) division. Vertical TT is a division type in which the first block is divided into three second blocks by two vertical lines. For example, when the first block of 2N×2N is divided based on Vertical TT, the first block may be divided into three second blocks with a width ratio of (a:b:c). Here, a, b, and c may be the same value or different values. Alternatively, a and c may be the same while b may be greater or less than a. Alternatively, a and b may be the same while c may be greater or less than a. Alternatively, b and c are the same while a may be larger or smaller than b.

The division described above may be performed based on the division information signaled from the encoding apparatus. The division information may include at least one of division type information, division direction information, or division ratio information.

The division type information may specify any one of the division types that are pre-defined in the encoding/decoding apparatus. The pre-defined division type may include at least one of QT, Horizontal BT, Vertical BT, Horizontal TT, Vertical TT, or non-division mode (No split). Alternatively, the division type information may mean information on whether or not QT, BT, or TT is applied, and may be encoded in the form of a flag or an index. In the case of BT or TT, the division direction information may indicate whether it is divided horizontally or vertically. In the case of BT or TT, the division ratio information may indicate the ratio of the width and/or the height of the second block.

Figure 4:
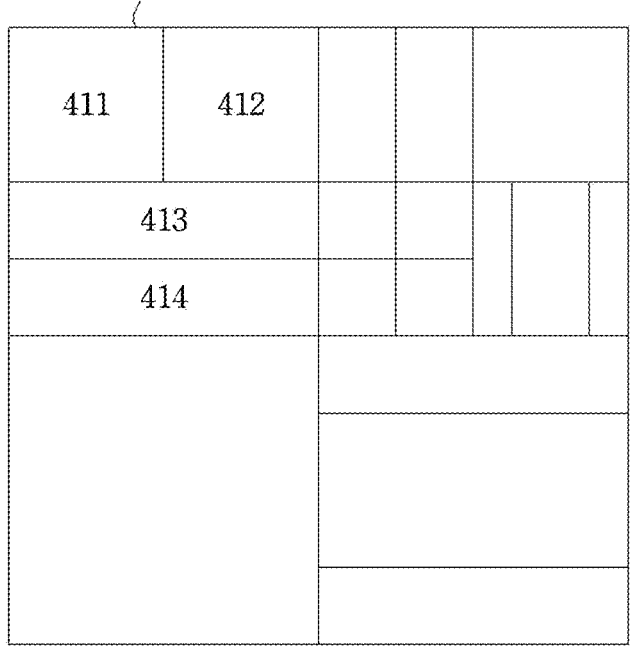
FIG. 4 illustrates a block division method based on a tree structure as an embodiment to which the present invention is applied.

FIG. 4 illustrates a tree structure-based block division method according to an embodiment in which the present invention is applied.

The block 400 illustrated in FIG. 4 is assumed to be a square block (hereinafter, referred to as a first block) having a size of 8N×8N and a division depth k. When the division information of the first block indicates QT division, the first block may be divided into four sub-blocks (hereinafter, referred to as a second block). The second block may have a size of 4N×4N and may have a division depth (k+1).

The four second blocks may be divided again based on either QT, BT, TT, or non-division mode. For example, when the division information of the second block indicates a horizontal binary tree (Horizontal BT), the second block is divided into two sub-blocks (hereinafter, referred to as a third block) as the second block 410 of FIG. 4. At this time, the third block may have a size of 4N×2N and may have a division depth (k+2).

The third block may also be divided again based on either QT, BT, TT, or non-division mode. For example, when the division information of the third block indicates a vertical binary tree (Vertical BT), the third block is divided into two sub-blocks 411 and 412 as illustrated in FIG. 4. At this time, the sub-blocks 411 and 412 may have a size of 2N×2N and a division depth (k+3). Alternatively, when the division information of the third block indicates a horizontal binary tree (Horizontal BT), the third block may be divided into two sub-blocks 413 and 414 as illustrated in FIG. 4. In this case, the sub-blocks 413 and 414 may have a size of 4N×N and a division depth (k+3).

The division may be performed independently or in parallel with the neighboring block, or may be performed sequentially according to a predetermined priority order.

The division information of the current block may be determined depending on at least one of the division information of the upper block of the current block or the division information of the neighboring block. For example, when the second block is divided based on Horizontal BT and the upper third block is divided based on Vertical BT, the lower third block does not need to be divided based on Vertical BT. If the lower third block is divided by Vertical BT, this is the same result as the second block is divided by QT. Therefore, encoding for the division information (particularly, the division direction information) of the lower third block may be skipped, and the decoding apparatus may be set so that the lower third block is divided in the horizontal direction.

The upper block may mean a block having a smaller division depth than the division depth of the current block. For example, when the division depth of the current block is (k+2), the division depth of the upper block may be (k+1). The neighboring block may be a block adjacent to the top or left side of the current block. The neighboring block may be a block having the same division depth as the current block.

The above-described division may be repeatedly performed up to the minimum unit of encoding/decoding. When divided into the minimum unit, the division information for the block is no longer signaled from the encoding apparatus. The information on the minimum unit may include at least one of a size or a shape of the minimum unit. The size of the minimum unit may be expressed by the width, the height, the minimum or maximum value of the width and height, the sum of the width and height, the number of pixels, or the division depth. The information on the minimum unit may be signaled in at least one of a video sequence, a picture, a slice, or a block unit. Alternatively, the information on the minimum unit may be a value pre-defined in the encoding/decoding apparatus. The information on the minimum unit may be signaled for each of CU, PU, and TU. Information on one minimum unit may be applied to CU, PU, and TU equally.

Figure 5:
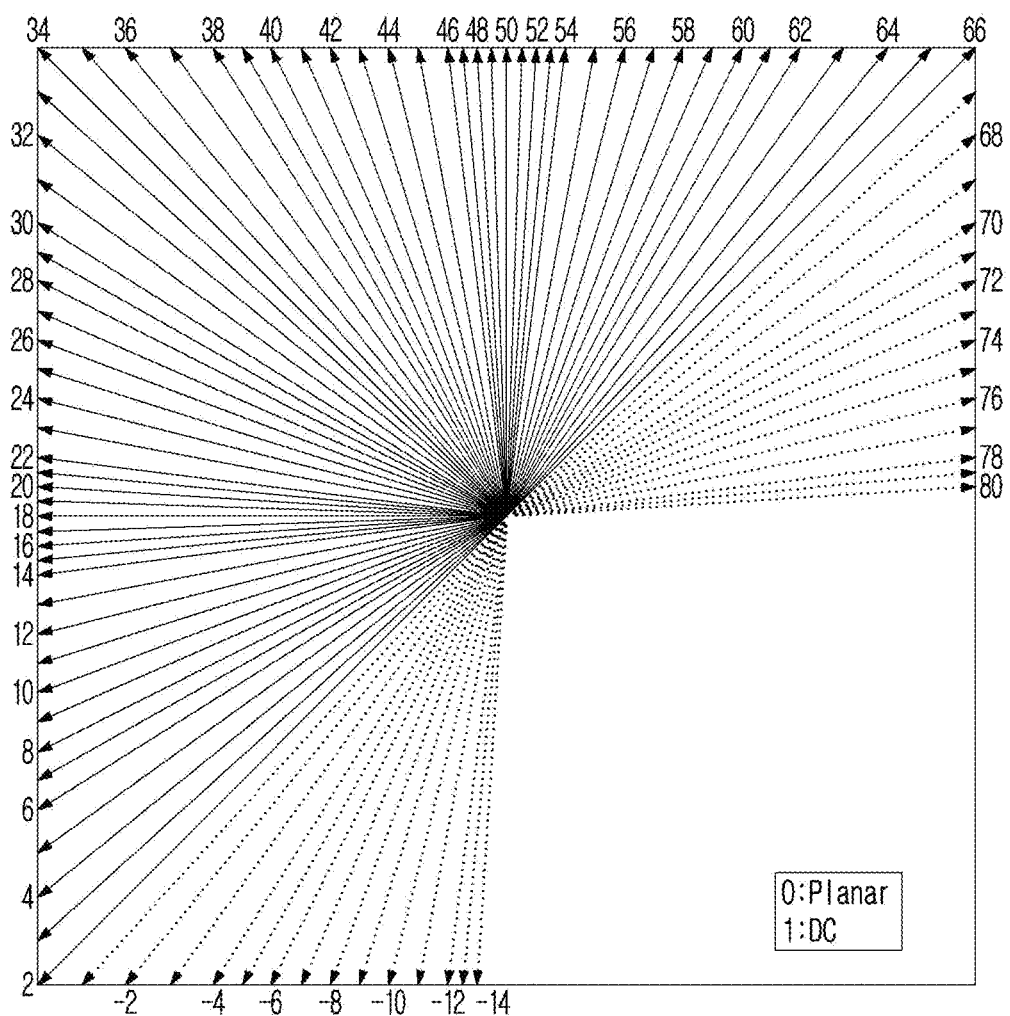
FIG. 5 is an exemplary diagram showing intra prediction modes pre-defined in an image encoding/decoding apparatus.

FIG. 5 is an exemplary diagram showing intra prediction modes pre-defined in an image encoding/decoding apparatus.

Referring to FIG. 5, the pre-defined intra prediction modes may be defined as a prediction mode candidate group consisting of 67 modes, and may include 65 directional modes (Nos. 2 to 66) and 2 non-directional modes (DC, planar). In this case, the directional mode may be classified with a slope (e.g., dy/dx) or angle information (Degree). All or some of the intra prediction modes described in the above example may be included in the prediction mode candidate group of the luma component or the chroma component, and other additional modes may be included in the prediction mode candidate group.

In addition, a reconstructed block of other color space that has been encoded/decoded using correlation between color spaces may be used for prediction of the current block, and a prediction mode supporting this may be included. For example, in the case of a chroma component, a prediction block of the current block may be generated by using a reconstructed block of a luma component corresponding to the current block. That is, a prediction block may be generated based on a reconstructed block in consideration of correlation between color spaces.

The prediction mode candidate group may be adaptively determined according to the encoding/decoding setting. The number of candidate groups may be increased for the purpose of improving the accuracy of prediction, and the number of candidate groups may be decreased for the purpose of reducing the amount of bits according to the prediction mode.

For example, one of candidate group A (67. 65 directional modes and 2 non-directional modes), candidate group B (35. 33 directional modes and 2 non-directional modes), candidate group C (18. 17 directional modes and 1 non-directional mode), etc. may be selected. The candidate group may be selected or determined according to a size and shape of a block.

In addition, it is possible to have various configurations of the prediction mode candidate group according to the encoding/decoding setting. For example, as shown in FIG. 5, a prediction mode candidate group may be configured evenly between modes, or in FIG. 5, the number of modes between modes 18 and 34 may be greater than the number of modes between modes 2 and 18. Alternatively, the opposite case may be possible. The candidate group may be adaptively configured according to the shape of the block (i.e., a square, non-square with width greater than height, non-square with height greater than width, etc.).

For example, when a width of a current block is greater than a height, all or some of the intra prediction modes belonging to 2 to 15 may not be used, and may be replaced by all or some of the intra prediction modes belonging to 67 to 80. On the other hand, when the width of the current block is less than the height, all or some of the intra prediction modes belonging to 53 to 66 may not be used, and may be replaced by all or some of the intra prediction modes belonging to −14 to −1.

In the present invention, unless otherwise specified, it is assumed that intra prediction is performed with one preset prediction mode candidate group (candidate A) having an equal mode interval, but the main elements of the present invention may also be changed and applied to the adaptive intra prediction setting as described above.

FIG. 6 illustrates an intra prediction method according to an embodiment to which the present invention is applied.

Referring to FIG. 6, a reference region for intra prediction of a current block may be determined (S600).

The encoding/decoding apparatus may define a plurality of pixel lines usable for intra prediction. The plurality of pixel lines may include at least one of a first pixel line adjacent to the current block, a second pixel line adjacent to the first pixel line, a third pixel line adjacent to the second pixel line, or a fourth pixel line adjacent to the third pixel line.

For example, depending on the encoding/decoding setting, the plurality of pixel lines may include all of the first to fourth pixel lines, or may include only the remaining pixel lines except for the third pixel line. Alternatively, the plurality of pixel lines may include only the first pixel line and the fourth pixel line.

The current block may select one or more pixel lines from among the plurality of pixel lines and use this as a reference region. In this case, the selection may be performed based on an index (refIdx) signaled by the encoding apparatus. Alternatively, the selection may be performed based on predetermined encoding information of the current block. Here, the encoding information may include at least one of a size, a shape, a division type, whether the intra prediction mode is a non-directional mode, whether the intra prediction mode has horizontal directionality, an angle of the intra prediction mode, or a component type. For example, when the intra prediction mode is a planar mode or a DC mode, only the first pixel line may be used. Alternatively, when the size of the current block is less than or equal to a predetermined threshold, only the first pixel line may be used. Here, the size may be expressed as any one of the width or height of the current block (e.g., maximum value, minimum value, etc.), the sum of the width and height, or the number of samples belonging to the current block. Alternatively, when the intra prediction mode is greater than a predetermined threshold angle (or smaller than a predetermined threshold angle), only the first pixel line may be used. The threshold angle may be an angle of an intra prediction mode corresponding to mode 2 or mode 66 among the aforementioned prediction mode candidate group.

Referring to FIG. 6, an intra prediction mode of the current block may be determined (S610).

The current block is a concept including a luma block and a chroma block, and the intra prediction mode may be determined for each of a luma block and a chroma block. Hereinafter, it is assumed that the intra prediction modes pre-defined in the decoding apparatus are composed of the non-directional modes (Planar mode, DC mode) and 65 directional modes.

The above-described pre-defined intra prediction modes may be divided into an MPM candidate group and a non-MPM candidate group. The intra prediction mode of the current block may be derived by selectively using one of the MPM candidate group or the non-MPM candidate group. To this end, a flag indicating whether an intra prediction mode of the current block is derived from the MPM candidate group may be used. For example, when the flag is a first value, the MPM candidate group may be used, and when the flag is a second value, the non-MPM candidate group may be used. The flag may be encoded and signaled by an encoding apparatus. Alternatively, the flag may be derived from a decoding apparatus based on predetermined encoding information. The encoding information is the same as described above, and redundant descriptions will be omitted.

When the flag is the first value, the intra prediction mode of the current block may be derived based on the MPM candidate group and an MPM index. The MPM candidate group includes one or more MPMs, and one ore more MPMs may be determined based on an intra prediction mode of a neighboring block of the current block. The number of MPMs is r, and r may be an integer of 1, 2, 3, 4, 5, 6, or more. The number of MPMs may be a fixed value pre-committed to the encoding/decoding apparatus or may be variably determined based on the above-described encoding information.

For example, the MPM candidate group may include at least one of an intra prediction mode of a neighboring block (modeA), modeA−n, modeA+n, or a default mode. The n value may be an integer of 1, 2, 3, 4 or more. The neighboring block may mean a block adjacent to the left and/or the top of the current block. However, the present invention is not limited thereto, and the neighboring block may include at least one of a top-left neighboring block, a bottom-left neighboring block, or a top-right neighboring block. The default mode may be at least one of a planar mode, a DC mode, or a predetermined directional mode. The predetermined directional mode may include at least one of a horizontal mode (modeV), a vertical mode (modeH), modeV−k, modeV+k, modeH−k, or modeH+k.

The MPM index may specify the same MPM as the intra prediction mode of the current block among MPMs of the MPM candidate group. That is, the MPM specified by the MPM index may be set as the intra prediction mode of the current block.

Alternatively, the MPM candidate group may be divided into a plurality of groups. For example, it is assumed that the MPM candidate group is divided into a first group and a second group. The first group may be configured with at least one of the above-described default modes. For example, the first group may be configured with only a non-directional mode or may be configured with only a predetermined directional mode. Alternatively, the first group may be configured with only a planar mode among non-directional modes, or may be configured with only a DC mode. The second group may include at least one of an intra prediction mode of a neighboring block (modeA), modeA−n, modeA+n, or a default mode. The n value may be an integer of 1, 2, 3, 4 or more. The neighboring block may mean a block adjacent to the left and/or the top of the current block. However, the present invention is not limited thereto, and the neighboring block may include at least one of a top-left neighboring block, a bottom-left neighboring block, or a top-right neighboring block. The default mode may be at least one of a planar mode, a DC mode, or a predetermined directional mode. The predetermined directional mode may include at least one of a horizontal mode (modeV), a vertical mode (modeH), modeV−k, modeV+k, modeH−k, or modeH+k. However, the second group may be set not to include the MPM belonging to the first group.

The intra prediction mode of the current block may be derived by selectively using one of the first group or the second group. To this end, a flag indicating whether an intra prediction mode of the current block is derived from the first group may be used. For example, when the flag is the first value, the intra prediction mode of the current block may be set to an MPM belonging to the first group. On the other hand, when the flag is the second value, the intra prediction mode of the current block may be derived based on the second group and the MPM index. Here, the MPM index is the same as described above, and a detailed description will be omitted.

The flag may be encoded and signaled by an encoding apparatus. However, the flag may be adaptively signaled in consideration of predetermined encoding information of the current block. Here, the encoding information may include at least one of a size, a shape, a division type, or a reference region. Here, the division type may mean a quad tree, a binary tree, a triple tree, or whether intra prediction is performed in a sub-block unit.

For example, only when the reference region of the current block is the first pixel line, the flag may be signaled (Embodiment 1). If the reference region of the current block is not the first pixel line, the flag may not be signaled and may be set to a second value in the decoding apparatus. Through this, when the current block does not refer to the first pixel line, it is possible to limit the induction of the intra prediction mode based on the first group.

In addition, the flag may be signaled only when the current block does not perform intra prediction in units of sub-blocks (Embodiment 2). Conversely, when the current block performs intra prediction in units of sub-blocks, the flag may not be signaled and may be set to a second value in the decoding apparatus.

When one condition of the above-described Embodiments 1 or 2 is satisfied, the flag may be signaled, or when both Embodiments 1 and 2 are satisfied, the flag may be set to be signaled.

Referring to FIG. 6, intra prediction may be performed on the current block based on the reference region for intra prediction and the intra prediction mode (S620).

The intra prediction may be performed in units of sub-blocks of the current block. To this end, the current block may be divided into a plurality of sub-blocks. The division method will be described in detail with reference to FIG. 7.

FIG. 7 illustrates an intra prediction method in units of sub-blocks as an embodiment to which the present invention is applied.

As described above, the current block may be divided into a plurality of sub-blocks. In this case, the current block may correspond to a leaf node. A leaf node may mean a coding block that is no longer divided into smaller coding blocks. That is, the leaf node may mean a block that is no longer divided through the tree-based block division described above.

The division may be performed based on the size of the current block (Embodiment 1).

Referring to FIG. 7, when the size of the current block 700 is smaller than a pre-determined threshold size, the current block may be divided into two vertically or horizontally. Conversely, when the size of the current block 710 is greater than or equal to the threshold size, the current block may be divided into four vertically or horizontally.

The threshold size may be signaled by the encoding apparatus or may be a fixed value pre-defined in the decoding apparatus. For example, the threshold size is expressed as N×M, and N and M may be 4, 8, 16 or more. The N and M may be the same or may be set differently from each other.

Alternatively, if the size of the current block is smaller than the pre-determined threshold size, the current block may not be divided (non-split), otherwise, the current block may be divided into two or four.

The division may be performed based on the shape of the current block (Embodiment 2).

If the shape of the current block is a square, the current block may be divided into four, otherwise, the current block may be divided into two. Conversely, when the shape of the current block is a square, the current block may be divided into two, and otherwise, the current block may be divided into four.

Alternatively, if the shape of the current block is a square, the current block is divided into two or four, otherwise, the current block may not be divided. Conversely, if the shape of the current block is a square, the current block may not be divided, otherwise, the current block may be divided into two or four.

It may be divided by selectively applying any one of the above-described Embodiments 1 or 2, or may be divided based on a combination of the Embodiments 1 and 2.

The 2-division is dividing into two in either vertical or horizontal direction, and the 4-division may include dividing into four in either vertical or horizontal direction, or dividing into four in vertical and horizontal directions.

In the above embodiment, 2-division or 4-division is described, but the present invention is not limited thereto, and the current block may be divided into three in a vertical or horizontal direction. In this case, the ratio of the width or height may be (1:1:2), (1:2:1), or (2:1:1).

Information on whether to be divided into sub-block units, whether to be divided into four, and the number of divisions may be signaled by the encoding apparatus or variably determined by the decoding apparatus based on a pre-determined coding parameter. Here, the coding parameter is representative of a block size/shape, a division type (4-division, 2-division, 3-division), an intra prediction mode, a range/position of neighboring pixels for intra prediction, and a component types (e.g., luma, and chroma), a maximum/minimum size of a transform block, a transform type (e.g., transform skip, DCT2, DST7, DCT8), and the like.

Figure 8:
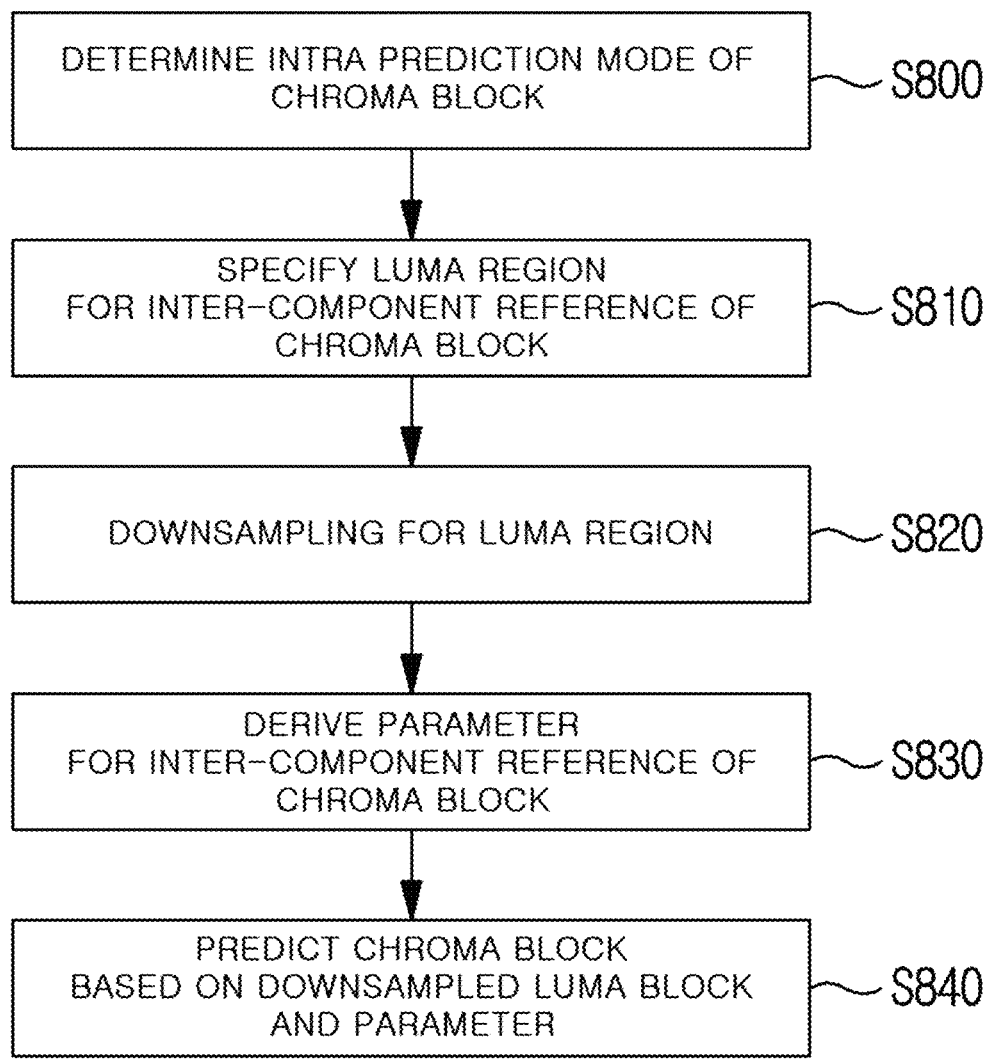
FIG. 8 illustrates an inter-component reference-based prediction method in an embodiment to which the present disclosure is applied.

FIG. 8 illustrates an inter-component reference-based prediction method in an embodiment to which the present disclosure is applied.

The current block may be divided into a luma block and a chroma block according to a component type. The chroma block may be predicted using the pixel of the reconstructed luma block. This is referred to as an inter-component reference. In this embodiment, it is assumed that the chroma block has a size of (nTbW×nTbH), and the luma block corresponding to the chroma block has a size of (2*nTbW× 2*nTbH). This assumes a case where the length ratio of the width and the height between the luma block and the chroma block is 2:1, but the example described below can be applied the same or similarly even when one of the width and height is 1:1 and the other is 2:1, or both are 1:1.

Referring to FIG. 8, an intra prediction mode of a chroma block may be determined (S800).

Specifically, pre-defined intra prediction modes for a chroma block may be divided into a first group and a second group. Here, the first group may be configured as an inter-component reference-based prediction mode, and the second group may be configured as pre-defined intra prediction modes for a luma block. The encoding/decoding apparatus may define at least one of INTRA_LT_CCLM, INTRA_L_CCLM, or INTRA_T_CCLM as an inter-component reference-based prediction mode.

The intra prediction mode of the chroma block may be derived by selectively using one of the first group or the second group. The selection may be performed based on a predetermined first flag. The first flag may indicate whether the intra prediction mode of the chroma block is derived based on the first group or the second group.

For example, when the first flag is a first value, the intra prediction mode of the chroma block may be determined as one of one or more inter-component reference-based prediction modes belonging to the first group. To this end, an index specifying any one of inter-component reference-based prediction modes belonging to the first group may be used. The inter-component reference-based prediction modes belonging to the first group and the indexes assigned to each prediction mode are shown in Table 1 below.

TABLE 1

| Idx | inter-component reference-based prediction mode |
|---|---|
| 0 | INTRA_LT_CCLM |
| 1 | INTRA_L_CCLM |
| 2 | INTRA_T_CCLM |

Table 1 is only an example of an index assigned to each prediction mode, and is not limited thereto. That is, as shown in Table 1, indexes may be assigned in the priority order of INTRA_LT_CCLM, INTRA_L_CCLM, INTRA_T_CCLM, or indexes may be assigned in the priority order of INTRA_LT_CCLM, INTRA_T_CCLM, INTRA_L_CCLM. Alternatively, INTRA_LT_CCLM may have a lower priority order than INTRA_T_CCLM or INTRA_L_CCLM.

The first flag may be selectively signaled based on information indicating whether inter-component reference is allowed. For example, if the value of the information is 1, the first flag may be signaled, otherwise, the first flag may not be signaled. Here, the information may be determined as 0 or 1 based on a predetermined condition to be described later.

(Condition 1) When a second flag indicating whether inter-component reference-based prediction is allowed is 0, the information may be set to 0. The second flag may be signaled in at least one of a video parameter set (VPS), a sequence parameter set (SPS), a picture parameter set (PPS), or a slice header.

(Condition 2) When at least one of the following sub-conditions is satisfied, the information may be set to 1.
 the value of qtbtt_dual_tree_intra_flag is 0
 the slice type is not I slice
 the size of the coding tree block is less than 64×64

In condition 2, qtbtt_dual_tree_intra_flag may indicate whether a coding tree block is implicitly divided into 64×64 coding blocks and a 64×64 coding block is divided based on a dual tree. The dual tree may refer to a method in which a luma component and a chroma component are divided with an independent division structure. The size of the coding tree block (CtbLog2Size) may be a pre-defined size (e.g., 64×64, 128×128, 256×256) in an encoding/decoding apparatus, or may be encoded and signaled by an encoding apparatus.

(Condition 3) When at least one of the following sub-conditions is satisfied, the information may be set to 1.
 the width and height of a first upper block are 64
 the depth of a first upper block is the same as (CtbLog2Size−6), a first upper block is divided based on Horizontal BT, and a second upper block is 64×32
 the depth of a first upper block is greater than (CtbLog2Size−6)
 the depth of a first upper block is the same as (CtbLog2Size−6), a first upper block is divided based on Horizontal BT, and a second upper block is divided based on Vertical BT In condition 3, the first upper block may be a block including the current chroma block as a lower block. For example, when the depth of the current chroma block is k, the depth of the first upper block may be (k−n), and n may be 1, 2, 3, 4 or more. The depth of the first upper block may mean only a depth according to division based on a quad tree, or may mean a depth according to division of at least one of a quad tree, a binary tree, or a triple tree. The second upper block is a lower block belonging to the first upper block, and may have a depth less than a current chroma block and a depth greater than the first upper block. For example, when the depth of the current chroma block is k, the depth of the second upper block is (k−m), and m may be a natural number less than n.

When all of the above-described conditions 1 to 3 are not satisfied, the information may be set to 0.

However, even when at least one of conditions 1 to 3 is satisfied, the information may be reset to 0 when at least one of the following sub-conditions is satisfied.
 the first upper block is 64×64 and the above-described sub-block unit prediction is performed
 at least one of the width or height of the first upper block is less than 64 and the depth of the first upper block is equal to (CtbLog2Size−6)

On the other hand, when the flag is a second value, the intra prediction mode of the chroma block may be derived as shown in Table 2 below based on information signaled by the encoding apparatus (intra_chroma_pred_mode).

TABLE 2

| intra_chroma_pred_mode | IntraPredMode Y [xCb + cbWidth/2] [yCb + cbHeight/2] | | | | |
|---|---|---|---|---|---|
| [xCb][yCb] | 0 | 50 | 18 | 1 | X(0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 56 | 1 |
| 4 | 0 | 50 | 18 | 1 | X |

According to Table 2, the intra prediction mode of the chroma block may be determined based on the signaled information and the intra prediction mode of the luma block. In Table 2, mode66 may mean a diagonal mode in the top-right direction, mode50 may mean a vertical mode, mode18 may mean a horizontal mode, and mode1 may mean a DC mode. For example, when the value of the signaled information intra_chroma_pred_mode is 4, the intra prediction mode of the chroma block may be set to be the same as the intra prediction mode of the luma block. When the intra prediction mode of the chroma block is derived from the second group, the chroma block may be predicted through the intra prediction method according to FIG. 6, and detailed descriptions will be omitted.

Referring to FIG. 8, a luma region for inter-component reference of the chroma block may be specified (S810).

The luma region may include at least one of a luma block or a neighboring region adjacent to the luma block. Here, the luma block may be defined as a region including pixels pY[x][y] (x=0 . . . nTbW*2−1, y=0 . . . nTbH*2−1). The pixels may mean reconstructed values before the in-loop filter is applied.

The neighboring region may include at least one of a left neighboring region, a top neighboring region, or a top-left neighboring region. The left neighboring region may be set as a region including pixels pY[x][y] (x=−1 . . . 3, y=0 . . . 2*numSampL−1). The setting may be performed only when the value of numSampL is greater than 0. The top neighboring region may be set as a region including pixels pY[x][y] (x=0 . . . 2*numSampT−1, y=−1 . . . −3). The setting may be performed only when the value of numSampT is greater than 0. The top-left neighboring region may be set as a region including pixels pY[x][y] (x=−1, y=−1,−2). The setting may be performed only when the top-left region of the luma block is available.

The above-described numSampL and numSampT may be determined based on the intra prediction mode of the current block. Herein, the current block may mean the chroma block.

For example, when the intra prediction mode of the current block is INTRA_LT_CCLM, it may be derived based on Equation 9. Here, INTRA_LT_CCLM may mean a mode in which inter-component reference is performed based on left and top neighboring regions to the current block.

$$numSampT = availT\,?\,nTbW:\,0 \qquad \text{[Equation 1]}$$

$$numSampL = availL\,?\,nTbH:\,0$$

According to Equation 1, numSampT is derived as nTbW when the top neighboring region to the current block is available. Otherwise, numSampT may be derived as 0. Similarly, numSampL is derived as nTbH when the left neighboring region to the current block is available. Otherwise, numSampT may be derived as 0.

To the contrary, when the intra prediction mode of the current block is not INTRA_LT_CCLM, it may be derived based on Equation 2 below.

$$numSampT = \qquad \text{[Equation 2]}$$

$$(availT\,\&\&\,predModeIntra == INTRA\_T\_CCLM)?$$

$$(nTbW + numTopRight):\,0$$

$$numSampL = (availL\,\&\&\,predModeIntra == INTRA\_L\_CCLM)?$$

$$(nTbH + numLeftBelow):\,0$$

In Equation 2, INTRA_T_CCLM may refer to a mode in which inter-component reference is performed based on a top neighboring region to the current block. INTRA_L_CCLM may mean a mode in which inter-component reference is performed based on a left neighboring region to the current block. numTopRight may mean the number of all or some pixels belonging to a top-right neighboring region to the chroma block. Some pixels may refer to available pixels among pixels belonging to the lowest pixel row of the corresponding region. In an availability determination, whether the pixels are available may determined sequentially in a left to a right direction. This process may be performed until an unavailable pixel is found. numLeftBelow may mean the number of all or some pixels belonging to a bottom-left neighboring region to the chroma block. Some pixels may refer to available pixels among pixels belonging to the rightmost pixel line (column) of the corresponding region. In the availability determination, whether pixels are available may be determined sequentially in a top to a bottom direction. This process may be performed until an unavailable pixel is found.

Referring to FIG. 8, down-sampling may be performed on the luma region specified in S810 (S820).

The down-sampling may include at least one of 1. Down-sampling of the luma block, 2. Down-sampling of the left neighboring region to the luma block, or 3. Down-sampling of the top neighboring region to the luma block. This will be described in detail below.

1. Down-Sampling of Luma Block

Embodiment 1

The pixel pDsY[x][y] (x=0 . . . nTbW−1, y=0 . . . nTbH−1) of the down-sampled luma block may be derived based on a corresponding pixel pY[2*x][2*y] of the luma block and the neighboring pixel. The neighboring pixel may mean at least one of a left neighboring pixel, a right neighboring pixel, a top neighboring pixel, or a bottom neighboring pixel to the corresponding pixel. For example, the pixel pDsY[x][y] may be derived based on Equation 3 below.

$$pDsY[x][y] = (pY[2*x][2*y-1] + \qquad \text{[Equation 3]}$$

$$pY[2*x-1][2*y] + 4*pY[2*x][2*y] +$$

$$pY[2*x+1][2*y] + pY[2*x][2*y+1] + 4) \gg 3$$

However, there may be a case where the left/top neighboring region to the current block are not available. When the left neighboring region to the current block is not available, the pixel pDsY[0][y] (y=1 . . . nTbH−1) of the down-sampled luma block may be derived based on the corresponding pixel pY[0][2*y] of the luma block and the neighboring pixel of the corresponding pixel. The neighboring pixel may mean at least one of the top neighboring pixel or the bottom neighboring pixel to the corresponding pixel. For example, pixel pDsY[0][y] (y=1 . . . nTbH−1) may be derived based on Equation 4 below.

$$pDsY[0][y] = (pY[0][2*y-1] + \qquad \text{[Equation 4]}$$

$$2*pY[0][2*y] + pY[0][2*y+1] + 2) \gg 2$$

When the top neighboring region to the current block is not available, the pixel pDsY[x][0] (x=1 . . . nTbW−1) of the down-sampled luma block may be derived based on the corresponding pixel pY[2*x][0] of the luma block and the neighboring pixel of the corresponding pixel. The neighboring pixel may mean at least one of the left neighboring pixel or the right neighboring pixel to the corresponding pixel. For example, the pixel pDsY[x][0] (x=1 . . . nTbW−1) may be derived based on Equation 5 below.

$$pDsY[x][0] = \qquad \text{[Equation 5]}$$

$$(pY[2*x-1][0] + 2*pY[2*x][0] + pY[2*x+1][0] + 2) \gg 2$$

The pixel pDsY[0][0] of the down-sampled luma block may be derived based on the corresponding pixel pY[0][0] of the luma block and/or a neighboring pixel of the corresponding pixel. The position of the neighboring pixel may vary depending on whether left/top neighboring regions to the current block are available.

For example, when the left neighboring region is available but the top neighboring region is not available, pDsY[0][0] may be derived based on Equation 6 below.

$$pDsY[0][0] = pY[-1][0] + 2*pY[0][0] + pY[1][0] + 2) >> 2 \quad \text{[Equation 6]}$$

To the contrary, when the left neighboring region is not available, but the top neighboring region is available, pDsY[0][0] may be derived based on Equation 7 below.

$$pDsY[0][0] = (pY[0][-1] + 2*pY[0][0] + pY[0][1] + 2) >> 2 \quad \text{[Equation 7]}$$

In another example, when both the left and top neighboring regions are not available, pDsY[0][0] may be set as the corresponding pixel pY[0][0] of the luma block.

Embodiment 2

The pixel pDsY[x][y] (x=0 . . . nTbW-1, y=0 . . . nTbH-1) of the down-sampled luma block may be derived based on the corresponding pixel pY[2*x][2*y] of the luma block and the neighboring pixel of the corresponding pixel. The neighboring pixel may mean at least one of a bottom neighboring pixel, a left neighboring pixel, a right neighboring pixel, a bottom-left neighboring pixel, or a bottom-right neighboring pixel to the corresponding pixel. For example, the pixel pDsY[x][y] may be derived based on Equation 8 below.

$$pDsY[x][y] = (pY[2*x-1][2*y] + pY[2*x-1][2*y+1] + \quad \text{[Equation 8]}$$
$$2*pY[2*x][2*y] + 2*pY[2*x][2*y+1] +$$
$$pY[2*x+1][2*y] + pY[2*x+1][2*y+1] + 4) >> 3$$

However, when the left neighboring region to the current block is not available, the pixel pDsY[0][y] (y=0 . . . nTbH-1) of the down-sampled luma block may be derived based on the corresponding pixel pY[0][2*y] of the luma block and a bottom neighboring pixel thereto. For example, the pixel pDsY[0][y] (y=0 . . . nTbH-1) may be derived based on Equation 9 below.

$$pDsY[0][y] = (pY[0][2*y] + pY[0][2*y+1] + 1) >> 1 \quad \text{[Equation 9]}$$

Down-sampling of the luma block may be performed based on one of Embodiments 1 and 2 as described above. Here, one of Embodiments 1 and 2 may be selected based on a pre-determined flag. The flag may indicate whether the down-sampled luma pixel has the same position as that of the original luma pixel. For example, when the flag is a first value, the down-sampled luma pixel has the same position as that of the original luma pixel. To the contrary, when the flag is a second value, the down-sampled luma pixel has the same position as that of the original luma pixel in the horizontal direction, but has a position shifted by half pel in the vertical direction.

2. Down-Sampling of Left Neighboring Region to Luma Block

Embodiment 1

The pixel pLeftDsY[y] (y=0 . . . numSampL-1) of the down-sampled left neighboring region may be derived based on the corresponding pixel pY[-2][2*y] of the left neighboring region and a neighboring pixel of the corresponding pixel. The neighboring pixel may mean at least one of a left neighboring pixel, a right neighboring pixel, a top neighboring pixel, or a bottom neighboring pixel to the corresponding pixel. For example, the pixel pLeftDsY[y] may be derived based on Equation 10 below.

$$pLeftDsY[y] = \quad \text{[Equation 10]}$$
$$(pY[-2][2*y-1] + pY[-3][2*y] + 4*pY[-2][2*y] +$$
$$pY[-1][2*y] + pY[-2][2*y+1] + 4) >> 3$$

However, when the top-left neighboring region to the current block is not available, the pixel pLeftDsY[0] of the down-sampled left neighboring region may be derived based on the corresponding pixel pY[-2][0] of the left neighboring region and a neighboring pixel of the corresponding pixel. The neighboring pixel may mean at least one of the left neighboring pixel or a right neighboring pixel to the corresponding pixel. For example, the pixel pLeftDsY[0] may be derived based on Equation 11 below.

$$pLeftDsY[0] = \quad \text{[Equation 11]}$$
$$(pY[-3][0] + 2*pY[-2][0] + pY[-1][0] + 2) >> 2$$

Embodiment 2

The pixel pLeftDsY[y] (y=0 . . . numSampL-1) of the down-sampled left neighboring region may be derived based on the corresponding pixel pY[-2][2*y] of the left neighboring region and a neighboring pixel around the corresponding pixel. The neighboring pixel may mean at least one of a bottom neighboring pixel, a left neighboring pixel, a right neighboring pixel, a bottom-left neighboring pixel, or a bottom-right neighboring pixel to the corresponding pixel. For example, the pixel pLeftDsY[y] may be derived based on following Equation 12.

$$pLeftDsY[y] = (pY[-1][2*y] + pY[-1][2*y+1] + \quad \text{[Equation 12]}$$
$$2*pY[-2][2*y] + 2*pY[-2][2*y+1] +$$
$$pY[-3][2*y] + pY[-3][2*y+1] + 4) >> 3$$

Similarly, down-sampling of the left neighboring region may be performed based on one of Embodiments 1 and 2 as described above. Here, one of Embodiments 1 and 2 may be selected based on a pre-determined flag. The flag indicates whether the down-sampled luma pixel has the same position as that of the original luma pixel. This is the same as described above.

Down-sampling of the left neighboring region may be performed only when the numSampL value is greater than 0. When the numSampL value is greater than 0, it may mean that the left neighboring region to the current block is available, and the intra prediction mode of the current block is INTRA_LT_CCLM or INTRA_L_CCLM.

3. Down-Sampling of Top Neighboring Region to Luma Block

Embodiment 1

The pixel pTopDsY[x] (x=0 . . . numSampT−1) of the down-sampled top neighboring region may be derived in consideration of whether the top neighboring region belongs to a CTU different from a CTU to which the luma block belongs.

When the top neighboring region belongs to the same CTU as the luma block, the pixel pTopDsY[x] of the down-sampled top neighboring region may be derived based on the corresponding pixel pY[2*x][−2] of the top neighboring region and a neighboring pixel of the corresponding pixel. The neighboring pixel may mean at least one of a left neighboring pixel, a right neighboring pixel, a top neighboring pixel, or a bottom neighboring pixel to the corresponding pixel. For example, the pixel pTopDsY[x] may be derived based on Equation 13 below.

$$pTopDsY[x] = \qquad\qquad\qquad\qquad \text{[Equation 13]}$$
$$(pY[2*x][-3] + pY[2*x-1][-2] + 4*pY[2*x][-2] +$$
$$pY[2*x+1][-2] + pY[2*x][-1] + 4) >> 3$$

To the contrary, when the top neighboring region belongs to a CTU different from the luma block, the pixel pTopDsY[x] of the down-sampled top neighboring region may be derived based on the corresponding pixel pY[2*x][−1] of the top neighboring region and a neighboring pixel of the corresponding pixel. The neighboring pixel may mean at least one of the left neighboring pixel or the right neighboring pixel to the corresponding pixel. For example, the pixel pTopDsY[x] may be derived based on Equation 14 below.

$$pTopDsY[x] = (pY[2*x-1][-1] + \qquad\qquad \text{[Equation 14]}$$
$$2*pY[2*x][-1] + pY[2*x+1][-1] + 2) >> 2$$

Alternatively, when the top-left neighboring region to the current block is not available, the neighboring pixel may mean at least one of the top neighboring pixel or the bottom neighboring pixel to the corresponding pixel. For example, the pixel pTopDsY[0] may be derived based on Equation 15 below.

$$pTopDsY[0] = \qquad\qquad\qquad\qquad \text{[Equation 15]}$$
$$(pY[0][-3] + 2*pY[0][-2] + pY[0][-1] + 2) >> 2$$

Alternatively, when the top-left neighboring region to the current block is unavailable and the top neighboring region belongs to a CTU different from the luma block, the pixel pTopDsY[0] may be set as the pixel pY[0][−1] of the top neighboring region.

Embodiment 2

The pixel pTopDsY[x] (x=0 . . . numSampT−1) of the down-sampled top neighboring region may be derived in consideration of whether the top neighboring region belongs to a CTU different from the luma block.

When the top neighboring region belongs to the same CTU as the luma block, the pixel pTopDsY[x] of the down-sampled top neighboring region may be derived based on the corresponding pixel pY[2*x][−2] of the top neighboring region and a neighboring pixel of the corresponding pixel. The neighboring pixel may mean at least one of a bottom neighboring pixel, a left neighboring pixel, a right neighboring pixel, a bottom-left neighboring pixel, or a bottom-right neighboring pixel to the corresponding pixel. For example, the pixel pTopDsY[x] may be derived based on Equation 16 below.

$$pTopDsY[x] = (pY[2*x-1][-2] + \qquad\qquad \text{[Equation 16]}$$
$$pY[2*x-1][-1] + 2*pY[2*x][-2] + 2*pY[2*x][-1] +$$
$$pY[2*x+1][-2] + pY[2*x+1][-1] + 4) >> 3$$

To the contrary, when the top neighboring region belongs to a CTU different from the luma block, the pixel pTopDsY[x] of the down-sampled top neighboring region may be derived based on the corresponding pixel pY[2*x][−1] of the top neighboring region and a neighboring pixel of the corresponding pixel. The neighboring pixel may mean at least one of the left neighboring pixel or the right neighboring pixel to the corresponding pixel. For example, the pixel pTopDsY[x] may be derived based on Equation 17 below.

$$pTopDsY[x] = (pY[2*x-1][-1] + \qquad\qquad \text{[Equation 17]}$$
$$2*pY[2*x][-1] + pY[2*x+1][-1] + 2) >> 2$$

Alternatively, when the top-left neighboring region to the current block is not available, the neighboring pixel may mean at least one of the top neighboring pixel or the bottom neighboring pixel to the corresponding pixel. For example, the pixel pTopDsY[0] may be derived based on Equation 18 below.

$$pTopDsY[0] = (pY[0][-2] + pY[0][-1] + 1) >> 1 \qquad \text{[Equation 18]}$$

Alternatively, when the top-left neighboring region to the current block is unavailable and the top neighboring region belongs to a CTU different from the luma block, the pixel pTopDsY[0] may be set as pixel pY[0][−1] of the top neighboring region.

In the similar manner, down-sampling of the top neighboring region may be performed based on one of Embodiments 1 and 2 as described above. Here, one of Embodiments 1 and 2 may be selected based on a pre-determined flag. The flag indicates whether the down-sampled luma pixel has the same position as that of the original luma pixel. This is the same as described above.

In one example, down-sampling of the top neighboring region may be performed only when the numSampT value is greater than 0. When the numSampT value is greater than 0, it may mean that the top neighboring region to the current block is available, and the intra prediction mode of the current block is INTRA_LT_CCLM or INTRA_T_CCLM.

Referring to FIG. 8, a parameter for inter-component reference of the chroma block may be derived (S830).

The parameter may include at least one of a weight or an offset. The parameter may be determined in consideration of the intra prediction mode of the current block. The parameter may be derived using at least one of a pixel of the luma region or a pixel of top/left neighboring regions to a chroma block. Here, the luma region may include at least one of the luma block or the top/left neighboring regions to the luma block. The luma region may mean a region to which the aforementioned down-sampling is applied.

The parameter may be derived using all or some pixels belonging to the neighboring region of the luma block and the chroma block.

Some pixels in the luma region may be specified, and some pixels in the chroma block may be determined as pixels at positions corresponding to the specified some pixels in the luma region (Embodiment 1). Some pixels in the luma region may be extracted from the top and left neighboring regions of the luma block, respectively. The number of some pixels extracted from the top neighboring region (numSampT) may be equal to the number of some pixels extracted from the left neighboring region (numSampL), or may be different from each other according to the size/shape of the luma block. For example, in an N*M luma block, when N is greater than M, numSampT is greater than numSampL, and when N is less than M, numSampT may be set to be less than numSampL. Alternatively, when the size of the luma block is smaller than a predetermined threshold size, at least one of numSampT or numSampL is determined as i, and i may be a natural number of 2, 3, 4, or more. Conversely, when the size of the luma block is larger than a predetermined threshold size, at least one of numSampT or numSampL is determined to be j, and j may be a natural number (e.g., 3, 4, 5) greater than i. Alternatively, some pixels may be extracted only from the top neighboring region of the luma block or may be extracted only from the left neighboring region. Even in this case, as described above, numSampT or numSampL may be determined according to the size/shape of the luma block. The positions of some of the pixels may be positions pre-committed to the encoding/decoding apparatus. For example, when the top neighboring region of the luma block is composed of 8 pixels, some pixels may be determined as at least one of four odd-numbered pixels from left to right, or at least one of four even-numbered pixels. Alternatively, the some pixels may include at least one of two odd-numbered pixels from left to right, and at least one of two even-numbered pixels from right to left. When each of the top/left neighboring regions of the luma block is composed of four pixels, some pixels may extract one or two pixels from the top/left neighboring regions, respectively. In this case, in the top neighboring region, it may be determined as at least one of two odd-numbered pixels or at least one of two even-numbered pixels. Alternatively, in the top neighboring region, it may be determined as at least one of the first and last two pixels. Some pixels may be extracted in the same manner in the left neighboring region.

Alternatively, conversely, some pixels in a neighboring region of the chroma block may be specified, and some pixels in a luma region may be determined as pixels at positions corresponding to some pixels in the neighboring region of the chroma block (Embodiment 2). Here, some pixels in the neighboring region of the chroma block may be determined according to a method of determining some pixels of the luma region described above, and redundant descriptions will be omitted.

A maximum value and a minimum value from the extracted some pixels may be calculated for a luma region and a chroma region, respectively. The maximum value and the minimum value may be respectively determined as a maximum value and a minimum value among a plurality of some pixels. Alternatively, a plurality of pixels may be arranged in descending order through size comparison between a plurality of pixels. In this case, an average between the upper t pixels may be set as the maximum value, and an average between the lower t pixels may be set as the minimum value. t may be 1, 2, 3 or more natural numbers.

Based on the calculated maximum and minimum values, the weight and/or offset of the parameter may be derived.

The chroma block may be predicted based on the down-sampled luma block and the parameter (S840).

The chroma block may be predicted by applying at least one of a pre-derived weight or offset to a pixel of the down-sampled luma block.

There may be various methods of performing prediction, and a method of performing prediction based on spatial or temporal correlation may be an example.

As an example based on spatial correlation, methods such as extrapolation, interpolation, averaging, and copying may be used using pre-encoded/decoded pixels in a region adjacent to the target block. Alternatively, a method such as block matching or template matching may be used in a reference region which has already been encoded/decoded. In this case, the reference region may be limited to the current picture.

As an example based on temporal correlation, a method of block matching or template matching may be used in a reference region which is pre-encoded/decoded. In this case, the reference region may be limited to other picture.

In general, prediction may be performed based on the correlation, but in the case of the above example, prediction may be classified according to a reference region (current picture/other picture). In this way, prediction may be distinguished not only by the reference region but also by various factors. For example, a reference region, a reference position, and a prediction method may be examples.

A case where prediction is defined as one or more candidates by the above various factors and prediction is performed based on the prediction will be described.

The following describes a case in which prediction is divided into a plurality of candidates by different factors when the reference region is restricted (the current picture in this example). In detail, it is assumed that prediction is performed based on spatial correlation, and the following two are classified as candidates according to a prediction method. Of course, the present invention is not limited thereto, and an example of a modification in which an additional candidate is supported or an element for classifying prediction is configured differently is also possible.

1) Prediction is performed through extrapolation, interpolation, or averaging of data in adjacent region
2) Prediction is performed through block matching in a pre-encoded/decoded region Here, in method 1, a predetermined directional mode, a non-directional mode, etc. may be configured as a prediction mode candidate group, and at least one of them may be selected to express prediction mode information. In method 2, prediction mode information may be expressed with motion vector information, reference picture information, etc.

Each of the prediction methods may be activated by information indicating whether to explicitly support or not, or whether to support or not may be implicitly determined.

In this example, it is assumed that method 1 is implicitly activated (supported), and method 2 is explicitly activated by information indicating whether or not to support.

For prediction of a target block, prediction may be performed using one of the prediction methods, and selection information may be generated. Further, according to the selected prediction method, subsequent prediction information (e.g., prediction mode information) may be generated, and various flags (syntax) may be configured for this. Hereinafter, a method of determining a prediction method will be described in detail with reference to FIGS. 9 to 12. The unit (current block) to which an example described below is applied may be one of a coding unit, a prediction unit, or a transform unit.

Figure 9:
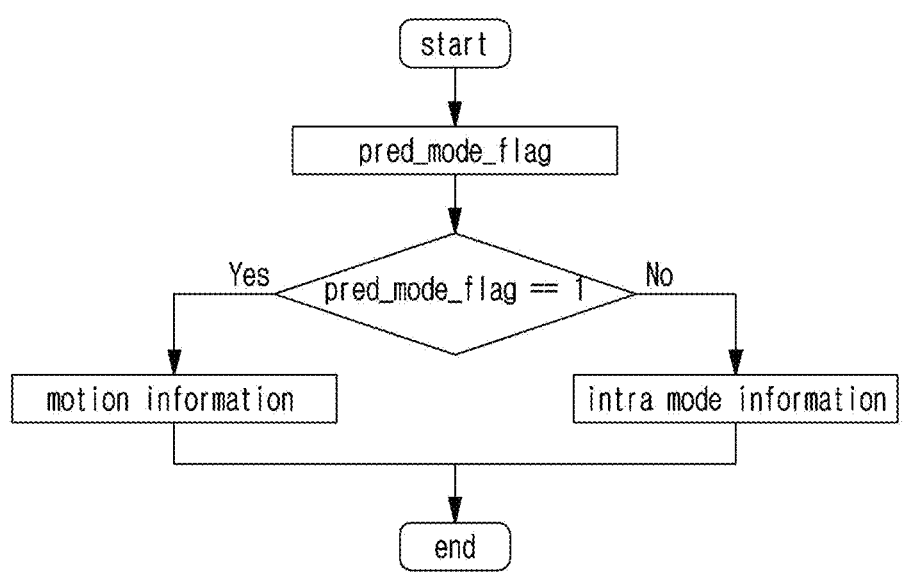
FIGS. 9 to 12 illustrate a method of determining a prediction method based on prediction method selection information as an embodiment to which the present invention is applied.

Referring to FIG. 9, when prediction method selection information (pred_mode_flag) is checked, and when one of method 1 or method 2 is selected accordingly, prediction mode information (intra_mode_information or motion_information) accordingly is checked, and the prediction may be performed based on the prediction method and the prediction mode information.

intra_mode_information refers to a prediction mode of extrapolation, interpolation, average. Like intra_pred_mode, the entire prediction modes may be configured as one candidate group, and it may be selected among them. Alternatively, the entire prediction modes may be configured as a plurality of candidate groups through classification according to a predetermined criterion such as mpm_flag, mpm_idx, remaining_mode, etc. Selection of a candidate group and selection among the selected candidate group may be available. A detailed description thereof will be omitted since it can be derived through the above-described example.

motion_information may include at least one of motion prediction mode (Skip/Merge/AMVP), motion vector prediction information, motion difference information, reference region selection information, motion model selection information, prediction direction information, or motion vector precision (or motion vector difference precision) information.

The motion vector prediction may be predicted from among the motion vectors of the blocks closest to the current block in the left, top, top-left, top-right, and bottom-left directions in the current picture. The present invention is not limited thereto, and a motion vector of a block separated by a predetermined distance (m, n) in a horizontal or vertical direction may also be used as a predicted value. Here, m and n may be 4, 8, 16 or more integers, and may be greater than or equal to the width and height of the minimum prediction unit (or coding unit, transform unit, etc.). That is, it may be predicted based on a motion vector of a block pre-encoded/decoded before the current block. In this case, a motion vector of a block which is not the closest may be managed in a FIFO scheme, based on a coding order based on the current block.

In addition, in another picture, it may be predicted from among motion vectors of blocks located in the left, right, top, bottom, top-left, top-right, bottom-left, bottom-right, and center of a block corresponding to the current block. Alternatively, (c, d) having a default value may be used as a predicted value of a motion vector, and it may have a value of (0, 0), but is not limited thereto.

In case of the motion model selection information, a candidate may be configured as a translational motion model or a non-translational motion model, and may be classified based on the number of motion vectors representing the motion of the current block (an integer of 1, 2, 3 or more), but not limited to this. In addition, the motion vector precision may be a power of 2 such as ¼, ½, 1, 2, 4, etc., wherein the exponent may be an integer (1, 2 or more) having a positive or negative sign including 0.

Here, the prediction method selection information may be classified according to the prediction method. When the block matching method (method 2) is selected, information related to general block matching (motion_information) may be generated. Here, in order to check what the reference region (reference picture) is, it may be configured to include the current picture in the reference picture list. That is, information such as ref_idx is generated as before, but the current picture may be included, in the list, as a candidate group of ref_idx.

The above description may be a description applied to a P or B image type, and may be similarly applied to an I image type, but may be omitted since information on a reference region may be implicitly determined in case of I image type. For that reason, since the reference region belongs to only the current picture, information such as ref_idx may be omitted, and information identical to or similar to general block matching may be generated.

Prediction method selection information may be generated regardless of an image type. That is, prediction method selection information may also be generated in the case of I image type. That is, block matching (ibc, intra block copy) may also be supported in the case of I image type.

Figure 10:
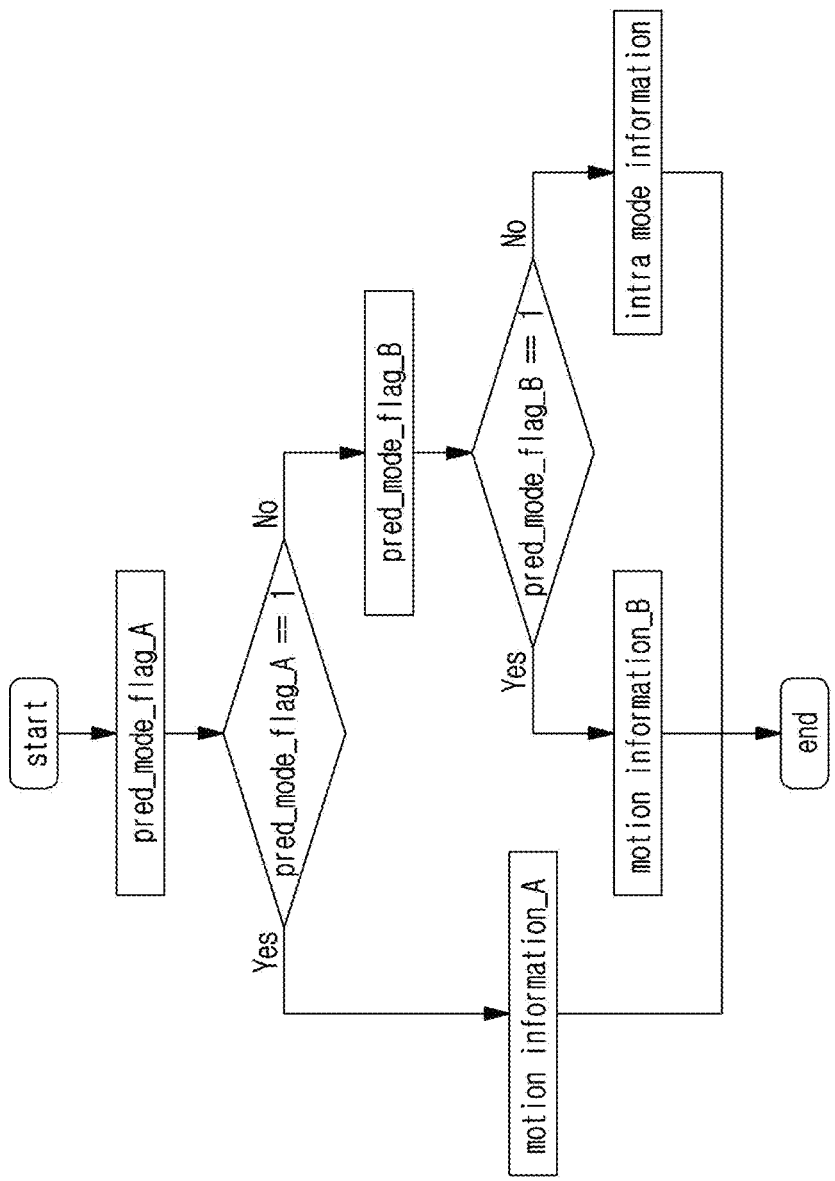

Referring to FIG. 10, prediction method selection information (pred_mode_flag_A) may be checked, and accordingly, whether to refer to a current picture or another picture may be determined. If it is determined to refer to another picture (pred_mode_flag_A is Y. That is, 1), the corresponding prediction mode information (motion_information_A) is checked. If it is determined to refer to the current picture (pred_mode_flag_A is N. that is, 0), one of method 1 or method 2 may be selected. According to the selected candidate, prediction mode information (intra_mode_information or motion_information_B) may be checked accordingly. The prediction may be performed based on the prediction method and prediction mode information.

Here, the prediction method selection information may be composed of a plurality of flags (conditional). In this example, one (pred_mode_flag_A) may be used to identify the reference region, and the other (pred_mode_flag_B) may be used to identify the prediction method (when the reference region is limited to the current picture). Here, prediction method selection information for the other (pred_mode_flag_B) may be conditionally generated.

The above description may be a description applied to P or B image type, and since the reference region is limited to the current picture in case of I image type, a process of checking pred_mode_flag_A may be omitted, and a process of immediately checking pred_mode_flag_B may be started.

Here, motion_information_A and motion_information_B may have a difference in the configuration of information on the reference region, and other configurations other than information to be described later may be the same or similar.

For example, in motion_information_A, a reference picture list is configured with a picture different from the current picture to process reference picture information, and in motion_information_B, information on the reference picture may be omitted.

Alternatively, in motion_information_A, forward or backward direction may be configured as a candidate for prediction direction information, and prediction direction information may be omitted in motion_information_B.

Alternatively, as a configuration of a block referenced for motion vector prediction, motion_information_A may target a spatially adjacent block and a temporally adjacent block, and motion_information_B may target a spatially adjacent block, and the detailed configuration of the spatially adjacent block may be the same or may not be the same. In addition, a default value for motion vector prediction may be configured to be the same or not the same.

Alternatively, as a candidate configuration for motion model selection information, motion_information_A has a motion model using 1 to 3 motion vectors as a candidate group, and motion_information_B has a motion model using one motion vector as a candidate group.

Alternatively, as a candidate configuration for motion vector precision information, the range of the exponent in motion information_A may be an integer having positive and negative signs including 0, and the range of the exponent in motion_information_B may be an integer having a positive sign including 0.

The above example describes a case where some prediction method selection information precedes, but the order may be changed. That is, after determining which one of method 1 or 2 is used to predict (pred_mode_flag_B), it may be determined whether to use a current picture or a different picture as the reference region (pred_mode_flag_A) if method 2 is selected among them. In the P or B image type, the order may be changed, and in the I image type, a part of selecting the reference region may be omitted.

Figure 11:
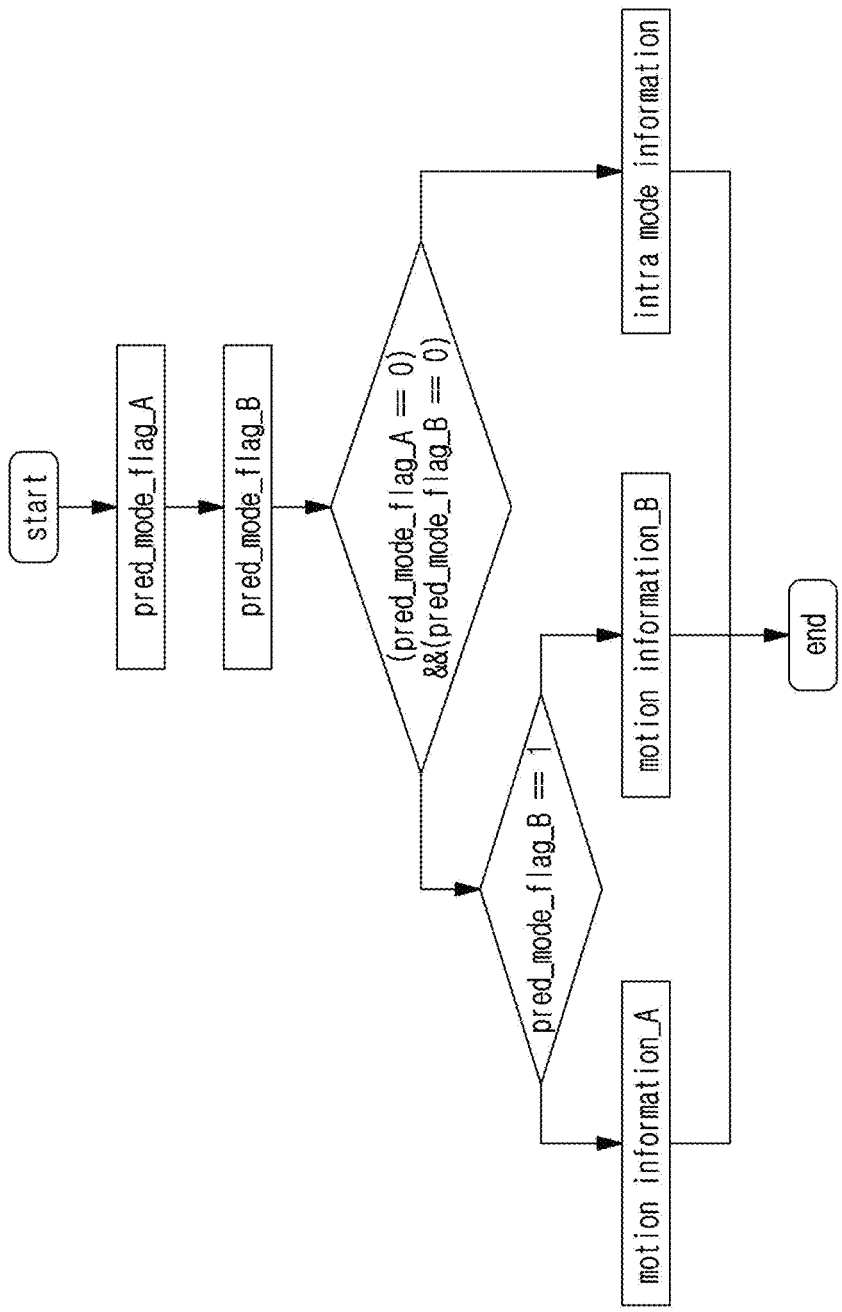

Referring to FIG. 11, prediction method selection information (pred_mode_flag_A, pred_mode_flag_B) may be checked, a reference region is determined as one of a current picture or another picture (pred_mode_flag_A), and one of method 1 or 2 is determined to predict (pred_mode_flag_B). In the case of the previous example, the prediction method selection information is conditionally checked, in this example, it may be different to check all of the prediction method selection information.

When the reference region is the current picture and method 1 is selected according to the prediction method selection information, prediction mode information (intra_mode_information) corresponding thereto may be checked. If the reference region is the current picture and method 2 is selected, prediction mode information (motion_information_B) corresponding to thereto may be checked. If the reference region is a different picture and method 2 is selected, prediction mode information (motion_information_A) corresponding to thereto may be checked.

In the case of motion_information_A and motion_information_B in this example, similar settings as in the previous example may be possible.

The above description may be a description applied to the P or B image type, and in the I image type, the prediction method selection information (pred_mode_flag_A) for the reference region may be checked or described excluding a subsequent part.

Figure 12:
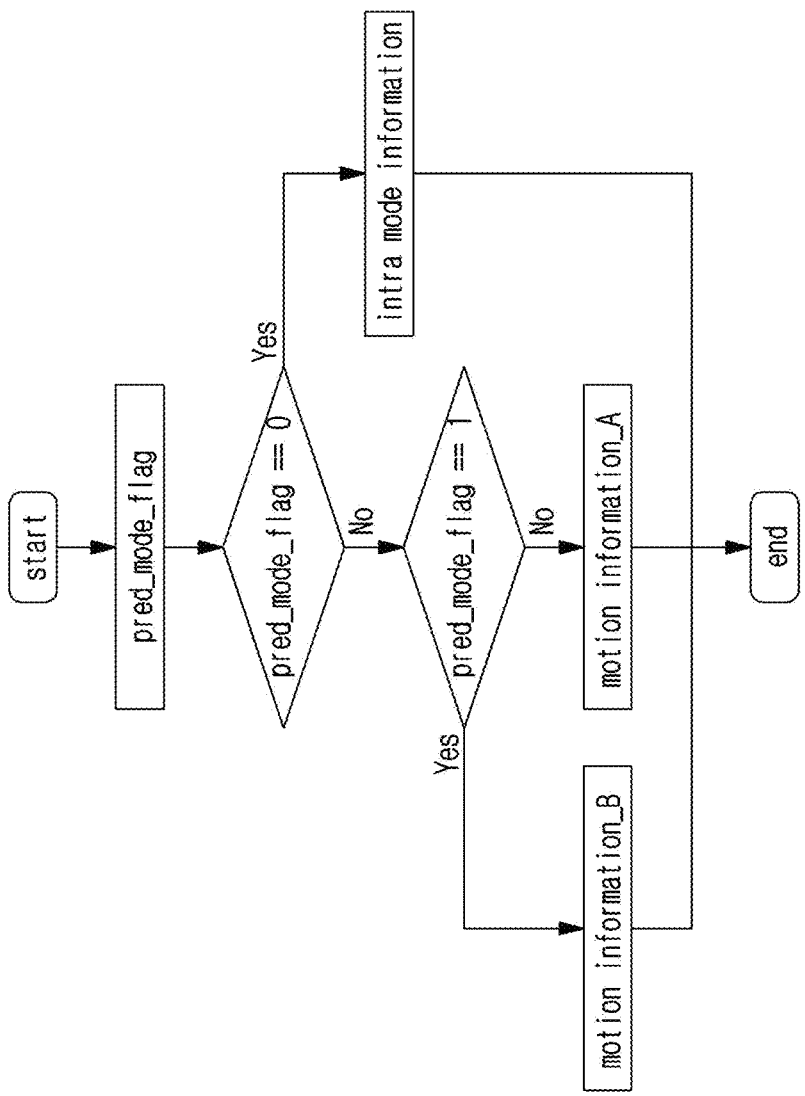

Referring to FIG. 12, prediction method selection information (pred_mode_flag) may be checked. If the value of pred_mode_flag is 0, method 1 is selected, and prediction mode information (intra_mode_information) according to method 1 may be checked. If the value of pred_mode_flag is 1, method 2 referring to the current picture is selected, and prediction mode information (motion_information_B) according to method 2 may be checked. If the value of pred_mode_flag is 2, method 2 referring to another picture is selected, and prediction mode information (motion_information_A) according to method 2 may be checked.

In this example, prediction method selection information is processed as one flag, but two or more indexes for this may be defined.

The above description may be a description applied to the P or B image type, and may not be applied to the I image type. That is, in the I image type, the prediction method selection information may have a value of 0 or 1, and in the P or B image type, the prediction method selection information may have a value of 0, 1, or 2. In this example, candidates referring to the current picture are first placed at 0 and 1, and a candidate referring to another picture are placed at 2 to prevent index rearrangement according to the image type. However, the present invention is not limited thereto, and indexes may be assigned in a different order.

All or some of the above-described prediction method selection information may be selectively signaled in consideration of block properties. Here, the block properties may include at least one of whether to apply a skip mode, an image type (slice type), a block size, a prediction type, or a division type. Here, the prediction type may be classified into a first prediction type including intra prediction and/or a block matching mode (ibc mode), a second prediction type including inter prediction, and a third prediction type including intra prediction, block matching mode, and inter prediction. In the block matching mode, a current block is predicted based on a pre-encoded/decoded region, and the pre-encoded/decoded region may mean a region specified by a predetermined block vector. The pre-encoded/decoded region may be a region belonging to a current picture to which the current block belongs. Inter prediction is similar to the block matching mode in that it is performed based on a reference region specified by a motion vector, but inter prediction is different in that it refers to a picture located in a different time zone from the current block.

For example, pred_mode_flag_A, which is one of the prediction method selection information, may be signaled only when at least one of when the current block is not encoded in the skip mode (condition 1), when the image type of the slice to which the current block belongs is not an I slice (condition 2), when a size of the current block is not 4×4 (condition 3), or when a prediction type is a third prediction type (condition 4) is satisfied.

However, if the above conditions are not satisfied, pred_mode_flag_A may not be signaled. In this case, the pred_mode_flag_A may be derived, in the decoding apparatus, based on at least one of a block size, a prediction type, or an image type. For example, when the current block is 4×4, pred_mode_flag_A may be derived as 1. Alternatively, when the prediction type for the current block is the first prediction type, pred_mode_flag_A may be derived as 1. Alternatively, when the prediction type for the current block is the second prediction type, pred_mode_flag_A may be derived as 0. Alternatively, if the image type of the slice to which the current block belongs is an I slice, pred_mode_flag_A may be derived as 1, otherwise, pred_mode_flag_A may be derived as 0.

Meanwhile, pred_mode_flag_B, which is one of prediction method selection information, may be signaled in consideration of at least one of whether to apply a skip mode, an image type, a block size, a prediction mode, a prediction type, or a division type.

For example, when the image type of the slice to which the current block belongs is an I slice and the current block is not encoded in the skip mode, the pred_mode_flag_B may be signaled. Alternatively, when the image type of the slice to which the current block belongs is not an I slice and the prediction mode of the current block is not intra prediction, the pred_mode_flag_B may be signaled. Alternatively, when the image type of the slice to which the current block belongs is not an I slice, the current block is 4×4, and the current block is not encoded in the skip mode, the pred_mode_flag_B may be signaled. Alternatively, the pred_mode_flag_B may be signaled only when at least one of the width or height of the current block is less than 64. Only when the prediction type for the current block is not the second prediction type, the pred_mode_flag_B may be signaled.

Meanwhile, if the above-described conditions are not satisfied, the pred_mode_flag_B may not be signaled. In this case, the pred_mode_flag_B may be derived, in the decoding apparatus, based on at least one of a block size, a prediction type, or an image type. For example, when the current block is 128×128, pred_mode_flag_B may be derived as 0. Alternatively, when the prediction type for the current block is the second prediction type, pred_mode_flag_B may be derived as 0. Alternatively, if the image type of the slice to which the current block belongs is an I slice, pred_mode_flag_B may be derived as 0 or 1, otherwise, pred_mode_flag_B may be derived as 0. Here, when the image type of the slice to which the current block belongs is an I slice, pred_mode_flag_B may be derived based on a flag indicating whether block matching is allowed. For example, pred_mode_flag_B may be derived as the same value as the flag. The flag may be signaled in at least one of a video parameter set, a sequence parameter set, a picture parameter set, or a slice header.

A prediction method for the current block may be selected based on at least one of the embodiments illustrated in FIGS. 9 to 12, and when the selected prediction method is intra prediction, intra prediction according to FIG. 6 or 8 may be performed.

Exemplary methods of the present disclosure are expressed as a series of operations for clarity of explanation, but this is not intended to limit the order in which steps are performed, and each step may be performed simultaneously or in a different order if necessary. In order to implement the method according to the present disclosure, the exemplary steps may include additional steps, other steps may be included excluding some steps, or may include additional other steps excluding some steps.

Various embodiments of the present disclosure are not intended to list all possible combinations, but to describe representative aspects of the present disclosure, and matters described in the various embodiments may be applied independently or may be applied in combination of two or more.

In addition, various embodiments of the present disclosure may be implemented by hardware, firmware, software, or a combination thereof. For implementation by hardware, one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general purpose It may be implemented by a processor (general processor), a controller, a microcontroller, a microprocessor, etc.

The scope of the present disclosure includes software or machine-executable instructions (e.g., operating systems, applications, firmware, programs, etc.) that cause an operation according to the method of various embodiments to be executed on a device or computer, and or a non-transitory computer-readable medium (non-transitory computer-readable medium) which stores such software or instructions etc., and is executable on a device or a computer.

INDUSTRIAL AVAILABILITY

The present invention may be used to encode/decode a video signal.

The invention claimed is:

1. A method of decoding an image, comprising:
determining a reference pixel line among a plurality of pixel lines for intra prediction of a current block;
determining a first flag indicating whether an intra prediction mode of the current block is derived from a first MPM group or a second MPM group, wherein an MPM (Most Probable Mode) candidate group is divided into the first MPM group comprising one or more default intra prediction modes and the second MPM group comprising one or more non-default intra prediction modes that are derived from an intra prediction mode of a neighboring block adjacent to the current block;
when the first flag is determined to be a first value, deriving an intra prediction mode of the current block based on a default intra prediction mode in the first MPM group;
when the first flag is determined to be a second value, deriving the intra prediction mode of the current block based on a non-default intra prediction mode in the second MPM group that is selected by an MPM index; and
performing the intra prediction on the current block based on the reference pixel line and the intra prediction mode,
wherein the plurality of pixel lines at least include a first pixel line immediately adjacent to the current block, a second pixel line immediately adjacent to the first pixel line, and a third pixel line immediately adjacent to the second pixel line,
wherein the first flag is determined by parsing a bitstream only when the reference pixel line of the current block is determined to be the first pixel line, and
wherein the second MPM group includes a plurality of intra prediction modes based on whether an intra prediction mode of a left neighboring block of the current block is equal to an intra prediction mode of a top neighboring block of the current block.

2. The method of claim 1, wherein the default MPM mode is composed of only a non-directional mode, and
wherein the non-directional mode includes at least one of a planar mode or a DC mode.

3. The method of claim 2, wherein the second MPM group further includes a mode derived by adding or subtracting an N value to the intra prediction mode of the neighboring block, and
wherein the N value is 1, 2, or 3.

4. The method of claim 1, further comprising:
dividing the current block into a plurality of sub-blocks, wherein the intra prediction is performed in units of the sub-blocks, and
wherein the number of the sub-blocks is variably determined based on a size or a shape of the current block.

5. The method of claim 1, wherein the first flag is determined to be the second value when the reference pixel line of the current block is determined not to be the first pixel line.

6. A method of encoding an image, comprising:
determining a reference pixel line among a plurality of pixel lines for intra prediction of a current block;

determining an intra prediction mode of the current block;

performing the intra prediction on the current block based on the reference pixel line and the intra prediction mode; and determining, based on the intra prediction mode of the current block, a first flag indicating whether the intra prediction mode of the current block is derived from a first MPM group or a second MPM group, wherein an MPM (Most Probable Mode) candidate group is divided into the first MPM group comprising one or more default intra prediction modes and the second MPM group comprising one or more non-default intra prediction modes that are derived from an intra prediction mode of a neighboring block adjacent to the current block, wherein the plurality of pixel lines at least include a first pixel line immediately adjacent to the current block, a second pixel line immediately adjacent to the first pixel line, and a third pixel line immediately adjacent to the second pixel line, and wherein the first flag is encoded into a bitstream only when the reference pixel line of the current block is determined to be the first pixel line, and wherein the first flag is determined to be a first value, when the intra prediction mode of the current block is a default intra prediction mode in the first MPM group, wherein the first flag is determined to be a second value, when the intra prediction mode of the current block is a non-default intra prediction mode in the second MPM group, wherein an MPM index indicating one among non-default intra prediction modes in the second MPM group is encoded into the bitstream, when the first flag is determined to be the second value, and wherein the second MPM group includes a plurality of intra prediction modes based on whether an intra prediction mode of a left neighboring block of the current block is equal to an intra prediction mode of a top neighboring block of the current block.

7. A method of transmitting a bitstream, the method comprising:

transmitting the bitstream generated by a method of encoding an image to an image decoding apparatus, wherein the method of encoding an image comprises determining a reference pixel line among a plurality of pixel lines for intra prediction of a current block;

determining an intra prediction mode of the current block;

performing the intra prediction on the current block based on the reference pixel line and the intra prediction mode; and determining, based on the intra prediction mode of the current block, a first flag indicating whether the intra prediction mode of the current block is derived from a first MPM group or a second MPM group, wherein an MPM (Most Probable Mode) candidate group is divided into the first MPM group comprising one or more default intra prediction modes and the second MPM group comprising one or more non-default intra prediction modes that are derived from an intra prediction mode of a neighboring block adjacent to the current block, wherein the plurality of pixel lines at least include a first pixel line immediately adjacent to the current block, a second pixel line immediately adjacent to the first pixel line, and a third pixel line immediately adjacent to the second pixel line, wherein the first flag is encoded into a bitstream only when the reference pixel line of the current block is determined to be the first pixel line, and wherein the first flag is determined to be a first value, when the intra prediction mode of the current block is a default intra prediction mode in the first MPM group, wherein the first flag is determined to be a second value, when the intra prediction mode of the current block is a non-default intra prediction mode in the second MPM group, wherein an MPM index indicating one among non-default intra prediction modes in the second MPM group is encoded into the bitstream, when the first flag is determined to be the second value, and wherein the second MPM group includes a plurality of intra prediction modes based on whether an intra prediction mode of a left neighboring block of the current block is equal to an intra prediction mode of a top neighboring block of the current block.

* * * * *